United States Patent [19]

Oka

[11] Patent Number: 5,537,591
[45] Date of Patent: Jul. 16, 1996

[54] METHOD AND APPARATUS FOR FORMING A FILE MANAGEMENT SYSTEM DIAGRAM

[75] Inventor: Yoshiharu Oka, Iruma, Japan

[73] Assignee: Casio Computer Co., Ltd., Tokyo, Japan

[21] Appl. No.: 332,435

[22] Filed: Oct. 31, 1994

Related U.S. Application Data

[63] Continuation of Ser. No. 854,418, Mar. 19, 1992, abandoned.

[30] Foreign Application Priority Data

Apr. 25, 1991 [JP] Japan .................... 3-095780

[51] Int. Cl.$^6$ .................................... G06F 17/30
[52] U.S. Cl. .................... 395/600; 364/DIG. 1; 364/222.81; 364/282.3
[58] Field of Search ..................... 395/600, 650; 364/555.01

[56] References Cited

U.S. PATENT DOCUMENTS

| | | | |
|---|---|---|---|
| 3,822,378 | 7/1974 | Kashio | 364/779 |
| 4,003,031 | 1/1977 | Kashio | 395/600 |
| 4,031,515 | 6/1977 | Kashio | 341/87 |
| 4,032,900 | 6/1977 | Kashio | 395/250 |
| 4,034,350 | 7/1977 | Kashio | 395/888 |
| 4,064,553 | 12/1977 | Kashio | 395/492 |
| 4,079,234 | 3/1978 | Kashio | 377/26 |
| 4,103,334 | 7/1978 | Kashio | 395/492 |
| 4,133,041 | 1/1979 | Kashio | 365/236 |
| 4,145,753 | 3/1979 | Kashio | 395/600 |
| 4,321,672 | 3/1982 | Braun et al. | 364/408 |
| 4,667,292 | 5/1987 | Mohlenbrock et al. | 364/406 |
| 4,809,170 | 2/1989 | Leblang et al. | 395/700 |
| 4,851,999 | 7/1989 | Moriyama | 364/401 |
| 4,860,204 | 8/1989 | Gendron | 395/140 |
| 4,914,569 | 4/1990 | Levine et al. | 395/500 |
| 4,924,385 | 5/1990 | Dote | 395/600 |
| 4,939,689 | 7/1990 | Davis et al. | 395/600 |
| 4,949,258 | 8/1990 | Miyamoto | 364/405 |
| 4,967,348 | 10/1990 | Naito et al. | 395/600 |
| 4,975,835 | 12/1990 | Hidaka et al. | 395/650 |
| 5,034,899 | 7/1991 | Schult | 395/143 |
| 5,185,867 | 2/1993 | Ito | 395/375 |
| 5,187,788 | 2/1993 | Marmelstein | 395/700 |
| 5,241,645 | 8/1993 | Cimral et al. | 395/500 |
| 5,257,185 | 10/1993 | Farley et al. | 364/419.19 |
| 5,262,761 | 11/1993 | Scandura et al. | 340/133 |
| 5,269,014 | 12/1993 | Ogino | 395/500 |
| 5,276,877 | 1/1994 | Friedrich et al. | 395/650 |
| 5,295,222 | 3/1994 | Wadhwa et al. | 395/1 |
| 5,301,336 | 4/1994 | Kodosky et al. | 395/800 |
| 5,327,553 | 7/1994 | Jewett et al. | 395/575 |
| 5,442,771 | 8/1995 | Filepp et al. | 395/650 |

FOREIGN PATENT DOCUMENTS 3005824  1/1991  Japan .

OTHER PUBLICATIONS

"A Survey of Automatic Flowchart Generators", by R. P. Watkins, The Australian Computer Journal, vol. 5, No. 3, Nov. 1973.

"The Design of Flog, An Automatic Flowchart Generator", by R. P. Watkins, The Australian Computer Journal, vol. 6, No. 3, Nov. 1974.

"Go with the Flow", by Peter A. Stark, Microcomputing, Apr. 1981, pp. 102–111.

"Linear Flowchart Generator for a Structured Language", by Patrick Roy, Sigplan Notices, Nov. 1976, pp. 58–64.

Primary Examiner—Wayne Amsbury
Attorney, Agent, or Firm—Frishauf, Holtz, Goodman, Langer & Chick

[57] ABSTRACT

In a data processing apparatus including a storage device for storing definition information, which defines data processing operation, and a data or for decoding the definition information in the storage device, and reading out data from, e.g., a file so as to execute data processing, the definition information is detected to display or print a system diagram, which is classified into processing operations associated with an input system, a file system, and an output system, so that the system diagram of data processing can be automatically output.

8 Claims, 20 Drawing Sheets

FIG. 3

42 MANAGEMENT INFORMATION FILE

| LAYER | KEY NAME | TITLE | RPS NAME |
|---|---|---|---|
| 1 | 1 1 | ACCOUNTING SYSTEM | |
| 2 | 1 1 1 | BASIC ACCOUNTING | |
| 3 | 1 1 1 1 | TABLE MAINTENANCE | |
| 4 | 1 1 1 1 1 | WORK NAME 1 | EO1 |
| 4 | 1 1 1 1 2 | WORK NAME 2 | EO2 |
| 4 | 1 1 1 1 3 | WORK NAME 3 | EO3 |
| 3 | 1 1 1 2 | BALANCE REGISTRATION | |
| 4 | 1 1 1 2 1 | WORK NAME 4 | EO4 |
| 4 | 1 1 1 2 2 | WORK NAME 5 | EO5 |
| 2 | 1 1 2 | DEPARTMENTAL ACCOUNTING | |
| 3 | 1 1 2 1 | | |
| | ⋮ | ⋮ | ⋮ |

FIG. 6

A TABLE
(DATA FETCH DEFINITION) — 141

| SOURCE FILE NAME | | | |
|---|---|---|---|
| LINE No. | ITEM NAME | TYPE | CONTENT |
| ⋮ | ⋮ | ⋮ | ⋮ |
| 15 | XX | I | |
| ⋮ | ⋮ | ⋮ | ⋮ |
| 20 | XXX | = | #INDEX (FILE NAME) |
| ⋮ | ⋮ | ⋮ | ⋮ |

C TABLE
(FILE UPDATING DEFINITION)

| UPDATING FILE NAME | | 201 |
|---|---|---|
| UPDATING TYPE | | 202 |
| LINE No. | FILE ITEM NAME | ITEM NAME |
| 1 | | |
| 2 | | |
| 3 | | |
| ⋮ | ⋮ | ⋮ |

D TABLE
(DISPLAY DEFINITION)

| LINE No. | ITEM NAME | Y | X | VERTICAL | HOLIZONTAL |
|---|---|---|---|---|---|
| 1 | | | | | |
| 2 | | | | | |
| 3 | | | | | |
| ⋮ | | | | | |

BASIC DEFINITION E01

| LINE | TITLE | EXECUTION PS NAME |
|---|---|---|
| 1 | START FRAME | PS01 |
| 2 | DAILY REPORT PRINTING | PS02 |
| 3 | RESULT DISPLAY | PS04 |
| | | |
| | | |
| | | |

DETAILED DEFINITION

BASIC DEFINITION EO2

| LINE | TITLE | EXECUTION PS NAME |
|---|---|---|
| 1 | SLIP INPUT PROCESSING | PS11 |
|  |  |  |
|  |  |  |

DETAILED DEFINITION

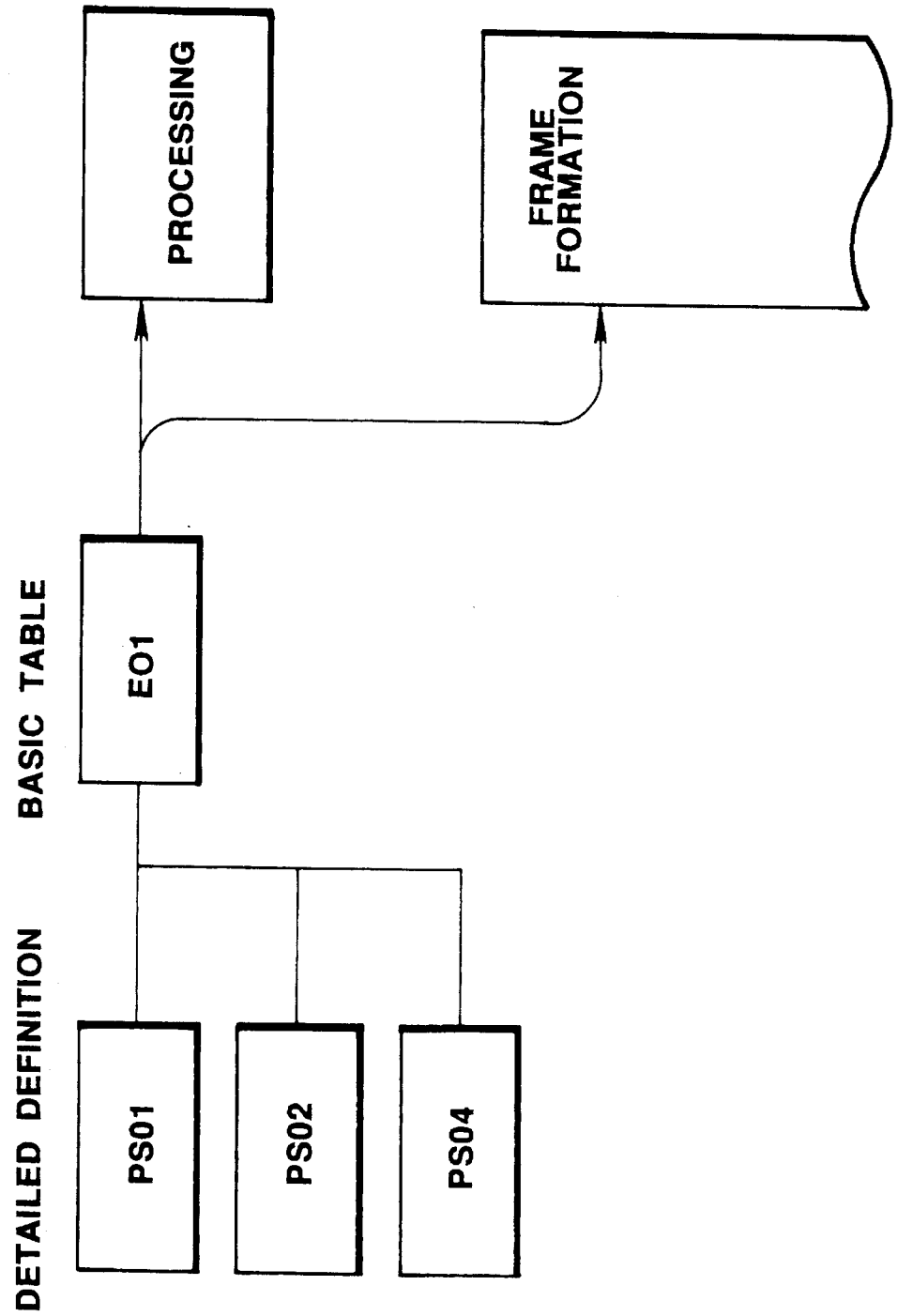

412 INPUT NAME MEMORY

414 OUTPUT NAME MEMORY

5,537,591

METHOD AND APPARATUS FOR FORMING A FILE MANAGEMENT SYSTEM DIAGRAM

This application is a Continuation of application Ser. No. 07/854,418, filed Mar. 19, 1992, abandoned.

BACKGROUND OF THE INVENTION

1. Field of the Invention

The present invention relates to an automatic system diagram forming apparatus for automatically forming a system diagram on the basis of definition information defining processes such as an input process, a file process, a display process and a print process to be executed by a computer system.

2. Description of the Related Art

System development is very detailed work for realizing a system specification upon reception of the results of system analysis of system objectives, and equipment investigation, and consists of tasks such as description of files and databases as input/output data, formation of external specifications of processes or programs as function units of processing, and the like.

In a system development, a system engineer (SE) forms a system outline plan and a system specification. In general, in the system basic design stage, a system is divided into a plurality of subsystems. In the system detailed design stage for designing the detailed subsystems, persons in charge are assigned to the subsystems, and individually form the specifications.

A system engineer (SE) is often asked to give an explanation for the summary of the entire system in, e.g., a meeting with a user.

In this case, however, the system outline plan and the system specification are written for engineers. For this reason, it is difficult for a user who is not skilled in the technical contents to understand these specifications, and an SE must often form a new drawing (diagram) which allows a user to easily understand the summary of the entire system. However, in order to form such a drawing (diagram), an SE must understand the overall system. The SE must often read the system outline plan and the system specification again to analyze the system, and must manually form an outline plan of the entire system after the analysis. Such tasks are a very large load on the SE, and require much time when the SE forms the new outline plan in a haste, he or she often forms a wrong outline plan of the entire system.

SUMMARY OF THE INVENTION

It is an object of the present invention to provide an apparatus, which can automatically form a system diagram representing a summary of the entire system associated with various data processing operations such as accounting processing.

A data processing apparatus comprises storage means for storing definition information, which defines data processing contents, together with names of data processing operations, file storage means for storing data for data processing as a file, data processing means for decoding the definition information, and reading out data from said file storage means on the basis of the decoding result so as to execute data processing, detection means for detecting at least definition information of processing associated with an input operation, definition information of processing associated with a file, and definition information of processing associated with an output operation from the definition information, and means for outputting a system diagram classified into the input, file, and output processing operations detected by said detection means together with the names of the data processing operations.

According to the present invention, definition information is analyzed for a system in which various data processing contents are systematically defined on the basis of the definition information, so as to automatically form a system diagram representing a summary of the entire system. For this reason, a system diagram representing a summary of the entire system can be more easily output without errors at higher speed by, e.g., display or printing, than manual formation of a system diagram while analyzing documented system specifications.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a view showing the internal architecture of a management information file;

FIG. 6 is a view showing the internal format of an A table;

FIG. 7 is a view showing the internal format of a C table;

FIG. 8 is a view showing the internal format of a D table;

FIG. 9 is a view showing contents of basic definitions of RPS processing having an RPS name "E01";

FIG. 12 is a schematic diagram showing processing executed by the basic definition of the RPS processing having the RPS name "E01";

DETAILED DESCRIPTION OF THE PREFERRED EMBODIMENTS

An embodiment of the present invention will be described below with reference to FIGS. 1 through 23.

Figure 1:
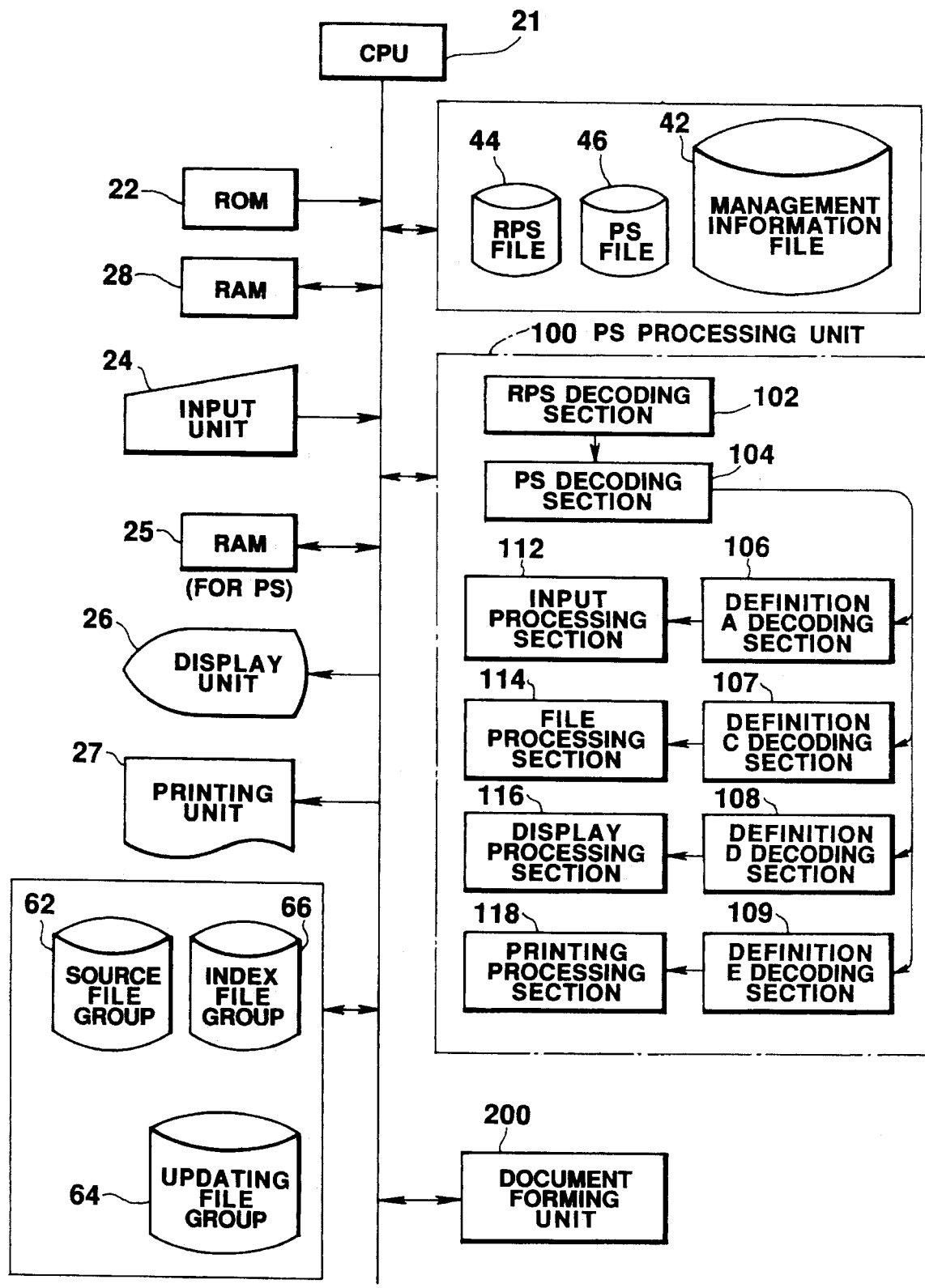
FIG. 1 is a block diagram showing a system arrangement of a data processing apparatus.

FIG. 1 is a block diagram showing the arrangement of the entire system of a data processing apparatus.

A CPU 21 executes a program stored in a ROM 22 to control the entire system, and controls a PS processing unit 100 and a document forming unit 200 (to be described later), thereby performing various data processing operations, processing for automatically forming a system outline diagram of the data processing operations, and the like.

An input unit 24 comprises, e.g., a keyboard, and is an input device used for inputting commands for instructing various works (i.e., tasks), a command for instructing formation of a system outline diagram, data, and the like.

A display unit 26 comprises various display devices such as a CRT display, an LCD (liquid crystal display), and the like, and displays various work (task) results, the system outline diagram, an echo back of data input from the input unit 24, and the like.

A printing unit 27 comprises a page printer, a line printer, or the like, and prints out documents, slips, and the like.

A management information file 42, an RPS file 44, and a PS file 46 are files which systematically define a system configuration associated with data processing such as accounting processing by a hierarchical structure. In the management information file 42, the system configuration is defined by the hierarchical structure. The RPS file 44 describes basic definitions of RPS processing operations (work processing operations) constituting each work block in each processing block (subsystem) defined in the management information file 42. The PS file 46 describes detailed definitions of PS processing operations described by the basic definitions of the RPS processing operations described in the RPS file 44, i.e., the detailed contents of PS processing operations to be performed in each RPS processing as a combination of A, C, D, and E tables.

The detailed architectures of the management information file 42, the RPS file 44, and the PS file 46 will be described in detail later.

The PS processing unit 100 executes various RPS processing operations described in the RPS file 44, and includes the following blocks.

An RPS decoding section 102 reads out a basic definition of designated RPS processing from the RPS file 44, and decodes the basic definition. The section 102 outputs PS names described in the basic definition to a PS decoding section 104 in the description order.

The PS decoding section 104 sequentially decodes detailed definitions of PS processing operations having the PS names input from the RPS decoding section in the input order, and starts a definition A decoding section 106, a definition C decoding section 107, a definition D decoding section 108, or a definition E decoding section 109 according to the description content of the detailed definition of each PS processing.

As will be described later, the detailed definition of PS processing describes, in the processing order, A, C, D, and E tables, each of which describes detailed processing contents in the form of a table. If the detailed definition includes the description of the A table in the description order, the PS decoding section 104 outputs the name of the A table to the definition A decoding section 106. If the detailed definition includes the description of the C table, the PS decoding section 104 outputs the name of the C table to the definition C decoding section 107. If the detailed definition includes the descriptions of the D and E tables, the PS decoding section 104 outputs the names of the D and E tables to the definition D decoding section 108 and the definition E decoding section 109, respectively.

The definition A decoding section 106, the definition C decoding section 107, the definition D decoding section 108, and the definition E decoding section 109 respectively decode A, C, D, and E tables having the designated names, and respectively start and control an input processing section 112, a file processing section 114, a display processing section 116, and a printing processing section 118 according to their decoding results.

According to the description of the A table, the input processing section 112 performs processing for forming a record having a new field (item) configuration based on records of a designated source file read out from a source file group 62, processing for forming a record for a start frame, and the like, and writes the formed records in a predetermined area of a RAM (random-access memory) 25 used as a work area of the PS processing unit 100. Therefore, the input processing section 112 basically performs a record read operation from the source file (i.e., a record output operation from the source file).

According to the description of the C table, the file processing section 114 performs processing for adding/deleting records to an updating file designated by the C table on the basis of the records written in the predetermined area of the RAM 25 by the input processing section 112, as described above, processing for modifying a predetermined record in an updating file, totalization for a specific field (specific item) of a predetermined record, and the like. Therefore, the file processing section 114 performs a record write operation to updating files (i.e., a record input operation to updating files).

According to the description of the D table, the display processing section 116 performs a display operation of a start frame onto the display unit 26 on the basis of the records written in the predetermined area of the RAM 25 by the input processing section 112, and the like.

According to the description of the E table, the printing processing section 118 performs a print-out operation of a daily report, a monthly sales, and the like formed by the file processing section 114, and written in the RAM 25.

The source file group 62 stores a plurality of source files as master files each of which stores a plurality of basic records necessary for performing various processing operations in this system. The basic records of each source file are records with keys consisting of a plurality of items. A key item is allocated at the beginning of the record, and a plurality of data items follows the key item. An arbitrary source file in the source file group 62 is designated by the A table.

An updating file group 64 stores a plurality of updating files as transaction files such as a daily report file, a monthly report file, a stock file, a sales file, and the like, and is updated day by day or every time a sale or a transaction occurs. A record of each updating file in the updating file group 64 is also a record with a key. An arbitrary updating file in the updating file group 64 is designated by the B table.

An index file group 66 consists of a plurality of index files each of which stores records each consisting of two items, i.e., a key item and a data item, and an index file is designated by the A table.

The document forming unit 200 automatically forms an outline diagram of the system configuration of this data processing on the basis of pieces of information stored in the management information file 42, the RPS file 44, and the PS file 46, and displays (or prints) it using the display unit 26 (or the printing unit 27).

A RAM 28 is a random-access memory mainly used as a work area by the document forming unit 200.

Figure 2:
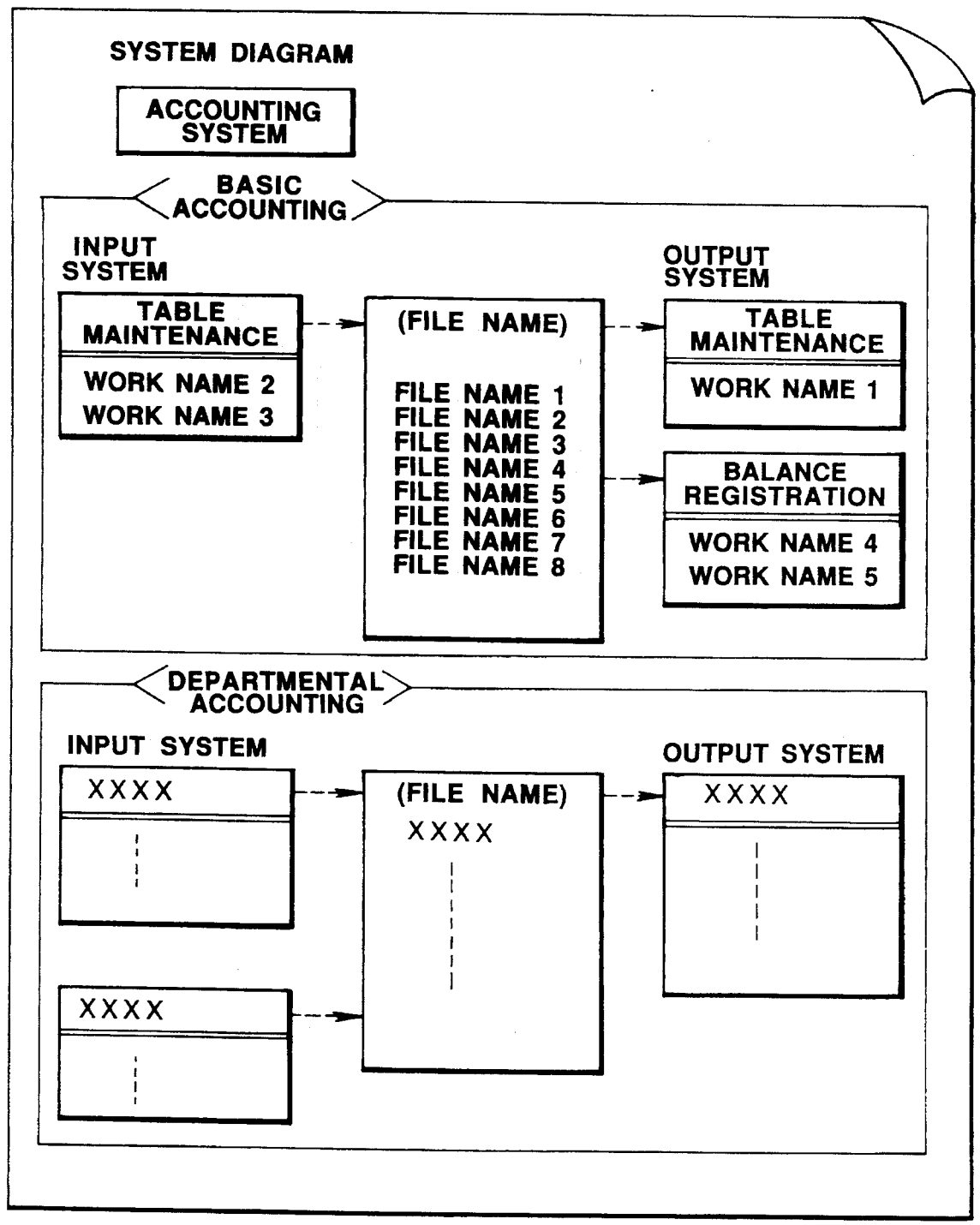
FIG. 2 shows a system diagram representing a summary of the system of this embodiment, formed by a document forming unit.

FIG. 2 shows a system diagram representing a summary of a system of data processing operations set in advance in the data processing apparatus with the above-mentioned arrangement.

As shown in FIG. 2, this system is an accounting system for performing accounting works (tasks), and comprises two subsystems (processing blocks), i.e., "basic accounting" and "departmental accounting" subsystems.

The system diagram expresses that the "basic accounting" subsystem is classified into input system processing for writing records into files, and output system processing for reading out records from files. The input system processing includes two work processing operations associated with "table maintenance work", and having titles "work name 2" and "work name 3". The output system processing includes work processing associated with "table maintenance work", and having a title "work name 1", and two work processing operations associated with "balance registration work", and having titles "work name 4" and "work name 5". The system diagram also expresses that files used in the "basic accounting" subsystem are eight kinds of files (source files, updating files, or index files) having file names 1, 2, . . . , 8. Similarly, although not shown in detail in FIG. 2, the configuration of the "departmental accounting" subsystem is expressed by works of an input system and titles of work processing operations realizing these works, works of an output system and titles of work processing operations realizing these works, and file names used in this subsystem.

FIG. 3 shows the internal architecture of the management information file 42, which describes the above-mentioned system configuration of the "accounting system" by a hierarchical structure.

As shown in FIG. 3, in the management information file 42, the first layer describes the system, the second layer describes subsystems (processing blocks) constituting the system, the third layer describes work blocks constituting each subsystem, and the fourth layer describes actual work processing operations (RPS processing operations) corresponding to program levels constituting the work block.

Figure 4:
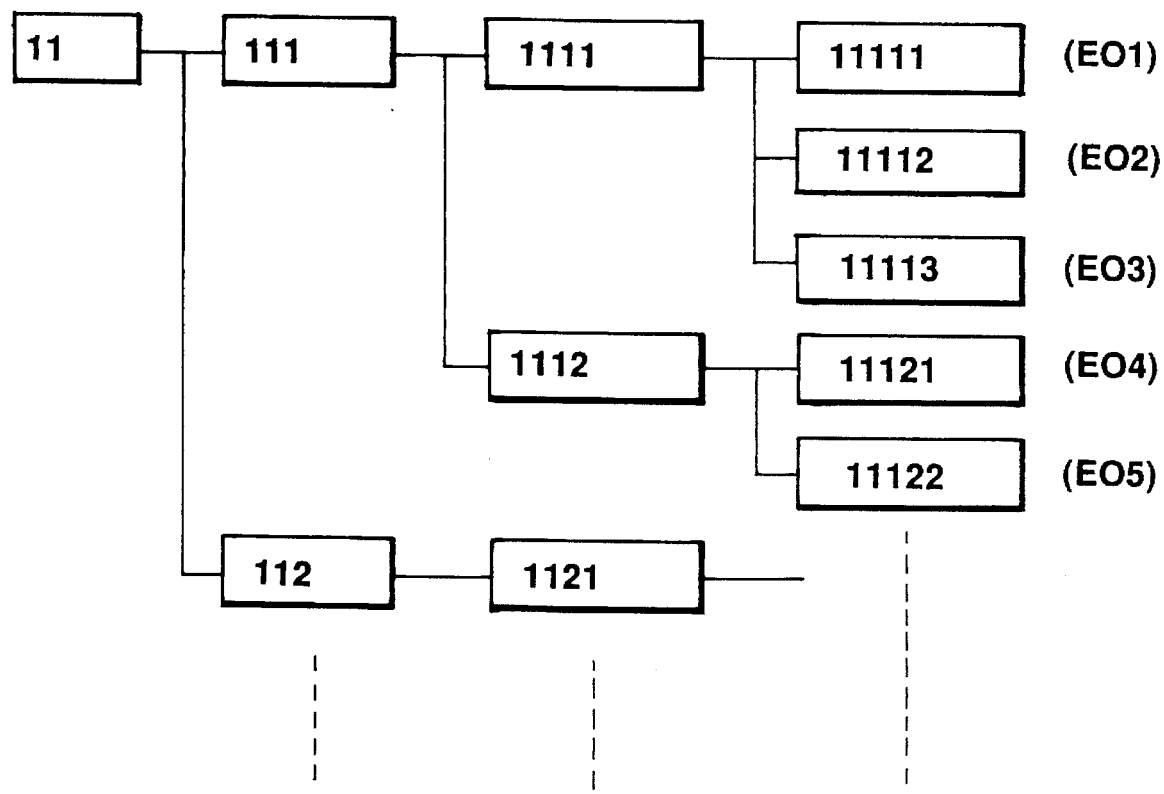
FIG. 4 is a chart showing the hierarchical structure of the system represented by key names.

As shown in FIG. 3, the first layer is described with a key name expressed by a two-digit numerical value, the second layer is described with a key name expressed by a three-digit numerical value, the third layer is described with a key name expressed by a four-digit numerical value, and the fourth layer is described with a key name expressed by a five-digit numerical value. Each key name has a title. Pieces of management information shown in FIG. 3 partially represent the accounting system having a key name "11". FIG. 4 hierarchically expresses the configuration of the accounting system in the tree structure using key names.

The accounting system consists of two subsystems, i.e., "basic accounting" having a key name "111", and "departmental accounting" having a key name "112". The "basic accounting" subsystem consists of two work blocks, i.e., "table maintenance" having a key name "1111", and "balance registration" having a key name "1112". Although particularly not shown in FIG. 2, the "departmental accounting" subsystem comprises a plurality of work blocks like in the "basic accounting" subsystem.

The "table maintenance" work block comprises three kinds of work processing operations (RPS processing operations) respectively having titles "work name 1" having a key name "11111", "work name 2" having a key name "11112", and "work name 3" having a key name "11113". The "balance registration" work block comprises two kinds of work processing operations respectively having titles "work name 4" having a key name "11121", and "work name 5" having a key name "11122".

The work processing operations (RPS processing operations) having the titles "work names 1, 2, 3, 4, and 5" correspond to program basic designs in the system design, and respectively have RPS names E01, E02, E03, E04, and E05.

The RPS file 44 is a file for storing contents of basic definitions in units of RPS processing operations having the above-mentioned RPS names. Each of the RPS processing operations having the RPS names E01, E02, . . . consists of one or a plurality of PS processing operations. Each PS processing corresponds to program processing, and the contents of basic definitions, which define details of actual processing of the respective PS processing operations are stored in the PS file 46.

Figure 5:
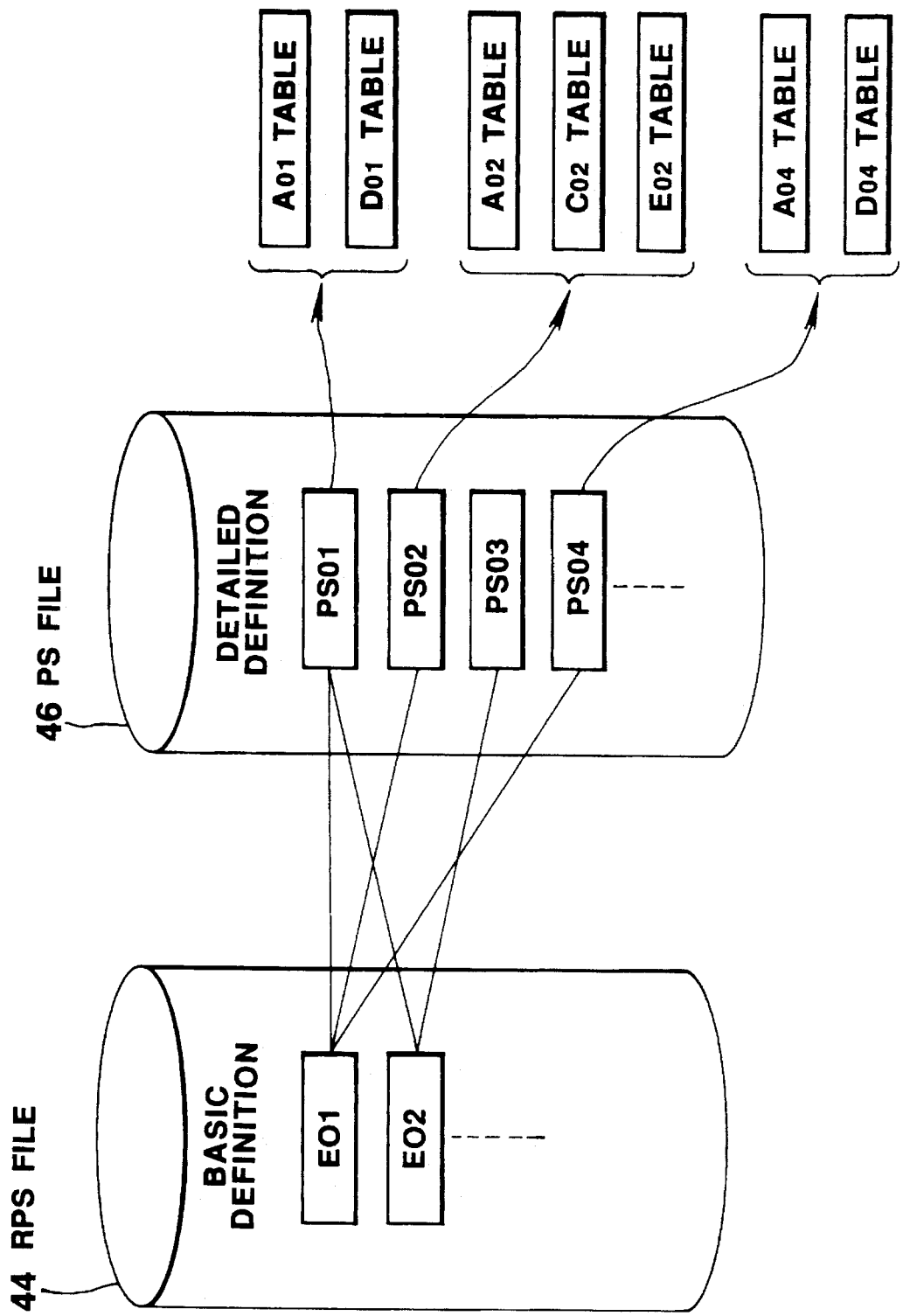
FIG. 5 is a chart for explaining the contents of RPS and PS files, and the linkage relationship between the two files.

FIG. 5 shows the linkage relationship between the RPS file 44 and the PS file 46. In the case of FIG. 5, RPS processing having an RPS name "E01" consists of three PS processing operations having PS names "PS01", "PS02", and "PS04". RPS processing having an RPS name "E02" consists of two PS processing operations having PS names "PS01" and "PS03". The basic definition of the PS processing having the PS name "PS01" describes "$A_{01}$ table, $D_{01}$ table", the basic definition of the PS processing having the PS name "PS02" describes "$A_{02}$ table, $C_{02}$ table, $E_{02}$ table", and the basic definition of the PS processing having the PS name "PS04" describes "$A_{04}$ table, $D_{04}$ table".

The A table ($A_{01}, A_{02}, A_{04}$), the C table ($C_{02}$), the D table ($D_{01}, D_{04}$), and the E table ($E_{02}$) are programs for instructing various processing operations. These tables are described in the form of a table according to the contents of data processing, and are stored.

The A table is a table in which the content of data input processing (data fetch processing) is defined, and its format is as shown in FIG. 6.

As shown in FIG. 6, the A table is constituted by a source file name 141, and a plurality of field definition data 142 consisting of three kinds of data (item name data 142a, TYPE data 142b, and content data 142c).

The source file name 141 is a column for designating a file name of an arbitrary one of the plurality of source files in the source file group 62 shown in FIG. 1. If no file name is designated in the source file name 141, all the item names to be displayed on the start frame are described in the item name data 142a.

The field definition data 142 is data for, when a source file name is described in the source file name 141, defining a format of a record to be formed from a record read out from a source file (designated source file) having the source file name. More specifically, of the field definition data 142, the item name data 142a designates a name of each item comprising a new record to be formed, and the order of arrangement of the data 142a (the order of line NOs.) corresponds to the order of arrangement of items in the new record to be formed. In the content data 142c, when the TYPE data 142b is "=", an arbitrary item name of a record input from the source file is set. On the other hand, when the TYPE data 142b is "I", the content data 142c is blank, and is set with a code serving as a key input from the input unit 24. If the content data 142c is described with "# index (file name)" when the TYPE data 142b is "=", a data item of an index file having the file name in the parentheses above, which item has a key coinciding with a code input from the input unit 24 in the field definition data 142 of the line NO. whose TYPE data 142b is "I", is set. Based on the above-mentioned definitions, the input processing section 112 replaces data having an item name described in the content data 142c in a record read out from the designated source file or data in an item read out from an index file with data having an item name described in the item name data 142a in the same field definition data 142; thereby forming a new record having a different item name or a different order of arrangement of items from that of a record read out from the source file. Then, the section 112 writes the new record in a predetermined area of the RAM 25.

The C table shown in FIG. 7 will be described below.

The C table is a table for defining various updating processing operations of a file (updating file) having a file name described in an updating file name 201, and the detailed content of the updating processing is designated by an updating type 202. The updating type 202 includes "totalization", "addition", "deletion", "correction", and the like. An item name 203 at the right side of the C table indicates the item name data 142a of a new record formed based on the A table. A file item name 204 at the left side of the C table indicates an item name in a record of the updating file. The item names 203 and the file item names 204 define to which file item names 204 the item names 203 of the new record formed by the input processing section 112 based on the A table, and written in the predetermined area of the RAM 25 correspond. The item name 203 and the file item name 204 described in the same line correspond to each other.

The file processing section 114 performs format conversion (in this case, sorting of items) for a record formed by the input processing section 112 according to the description of the C table, as needed, thereby forming a new record complying with the record format of the updating file. On the basis of a key of the formed record, the section 114 performs processing designated by the updating type 202 for a record having the corresponding key in the updating file. More specifically, if the updating type 202 is "totalization", the section 114 performs totalization processing of the specific item (e.g., "amount", "volume", or the like) of the record (corresponding record) having the key. If the updating type 202 is "deletion", the section 114 deletes the corresponding record. If the updating type 202 is "addition", the section 114 adds the corresponding record to the updating file. Furthermore, if the updating type 202 is "correction", the section 114 corrects the specific item (e.g., "commodity name", "commodity number", or the like) of the corresponding key.

The D table shown in FIG. 8 will be described below.

The D table defines the format of a frame to be displayed on the display unit 26, and items to be displayed are described in item name data 301. The item name data 301 corresponds to the item name data 142a of the A table shown in FIG. 6. More specifically, the content displayed on the display unit 26 by the display processing section 116 is the content of the record written in the predetermined area of the RAM 25 by the input processing section 112. "Y" and "X" in the D table represent screen coordinate positions on the display unit 26, i.e., indicate a display start position of an item (display item) having the corresponding item name 301. Furthermore, "vertical" and "horizontal" define the size of a display region of the display item by the number of dots in the vertical direction (defined in "vertical"), and the number of dots in the horizontal direction (defined in "horizontal"), and regulate the display region of the display item together with the display start position.

Although the format of the E table is not shown particularly, the E table defines a printing format used when the printing processing section 118 outputs, e.g., a daily report to the printing unit 27 on the basis of the record formed by the input processing section 112.

FIG. 9 shows the content of the basic definition of RPS processing having the RPS name "E01" stored in the RPS file 44.

As shown in FIG. 9, the basic definition of the RPS processing describes PS names (execution PS names) of PS processing operations to be executed in the order of "PS01", "PS02", and "PS04" in correspondence with the execution order of processing operations. The basic definition also describes that titles corresponding to the execution PS names "PS01", "PS02", and "PS04" are respectively "start frame", "daily report printing", and "result display".

Figure 10A:
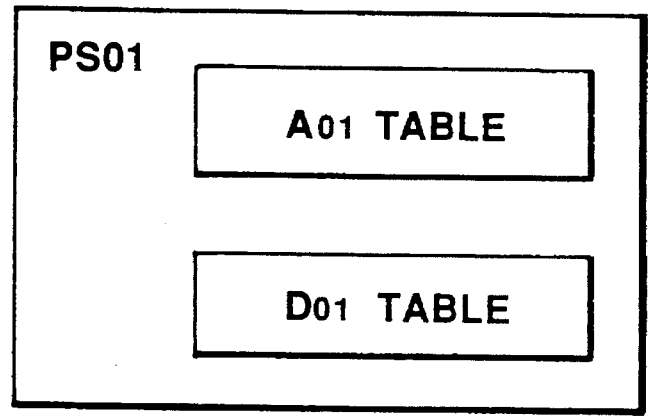
FIGS. 10(a) through 10(c) are views showing contents of detailed definitions of PS processing operations having execution PS names "PS01", "PS02", and "PS04"
Figure 10B:
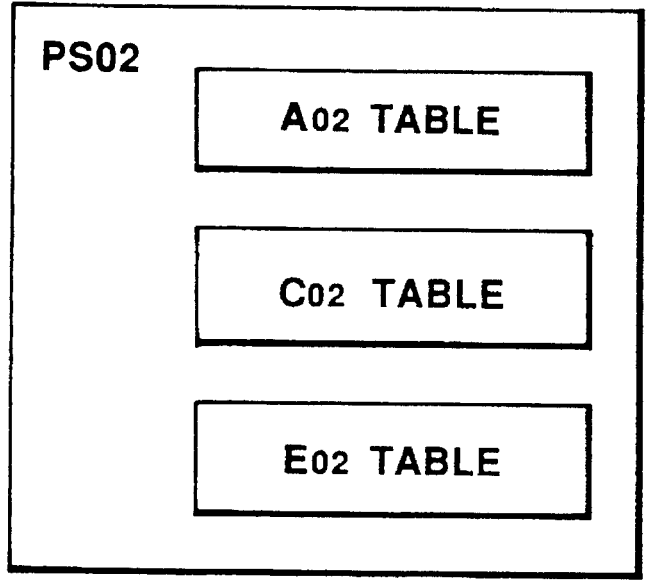
Figure 10C:
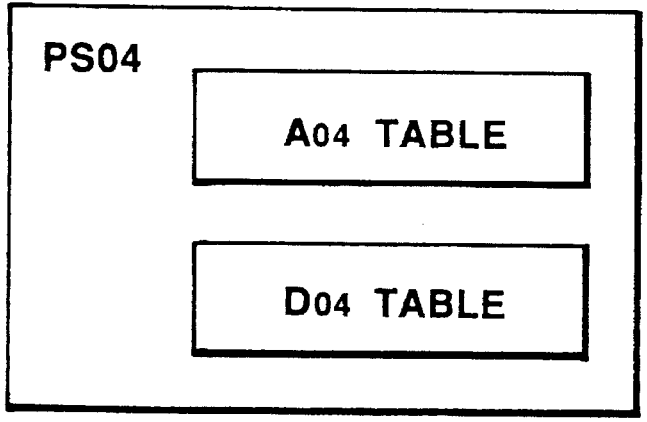

FIGS. 10(a) through 10(c) show the content of the PS file 46, which describes detailed definitions of the PS processing operations having the execution PS names "PS01", "PS02", and "PS04" described in the basic definition of the RPS processing having the RPS name "E01".

As shown in FIG. 10(a), the detailed definition of the PS processing having the execution PS name "PS01" describes "$A_{01}$ table" and "$D_{01}$ table" in the execution order of processing operations. As shown in FIG. 10(b), the detailed definition of the PS processing having the execution PS name "PS02" describes "$A_{02}$ table", "$C_{02}$ table", and "$E_{02}$ table" in the execution order of processing operations. Furthermore, as shown in FIG. 10(c), the PS processing having the execution PS name "PS04" describes "$A_{04}$ table" and "$D_{04}$ table" in the execution order of processing operations. Although not shown in detail in FIGS. 10(a) through 10(c), the PS file 46 describes the A table ($A_{01}$ table, $A_{02}$ table, $A_{04}$ table), the C table ($C_{02}$ table), and the D table ($D_{01}$ table, $D_{04}$ table) in the form of a table shown in FIGS. 6, 7, or 8. The PS file also describes the $E_{02}$ table in a predetermined table form.

Figures 11A, 11B:
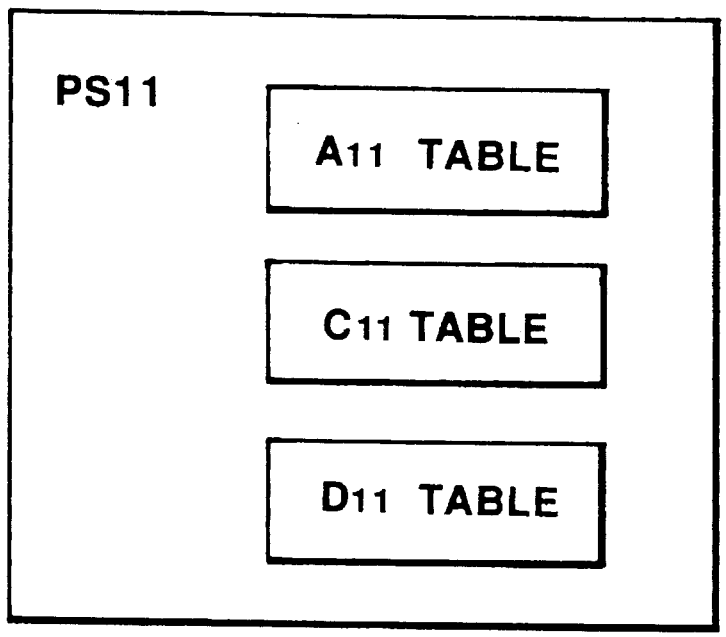
FIGS. 11(a) and 11(b) are views showing the content of a basic definition of RPS processing having an RPS name "E02", and the content of PS processing having an execution PS name "PS11", which processing is defined by the basic definition.

FIGS. 11(a) and 11(b) respectively show the description content of the basic definition of the RPS processing having the RPS name "E02" stored in the RPS file 44, and the description content of the detailed definition of the PS processing having the execution PS name "PS11" stored in the PS file 46, and described in the basic definition.

As shown in FIG. 11(a), the basic definition of the RPS processing having the RPS name "E02" describes only the PS processing entitled "slip input processing", and having the execution PS name "PS11". As shown in FIG. 11(b), the detailed definition of the PS processing (PS11) describes "$A_{11}$ table", "$C_{11}$ table", and "$D_{11}$ table" in the execution order of processing operations.

As described above, in this embodiment, as schematically shown in FIG. 12, the definition of the processing block entitled "table maintenance" is given to the RPS processing having the RPS name "E01", and the basic definition of this RPS processing describes the detailed definitions of the PS processing operations in units of function modules (corresponding to program levels) to have the execution PS names "PS01", "PS02", and "PS03". The A, C, D, or E tables described in the detailed definition of each of the PS processing operations having the execution PS names "PS01", "PS02", and "PS03" are sequentially interpreted in the order of descriptions, thereby performing generation of the detailed definitions of the PS processing operations on the start frame, daily report printing processing, and generation of a result display frame.

Figure 13:
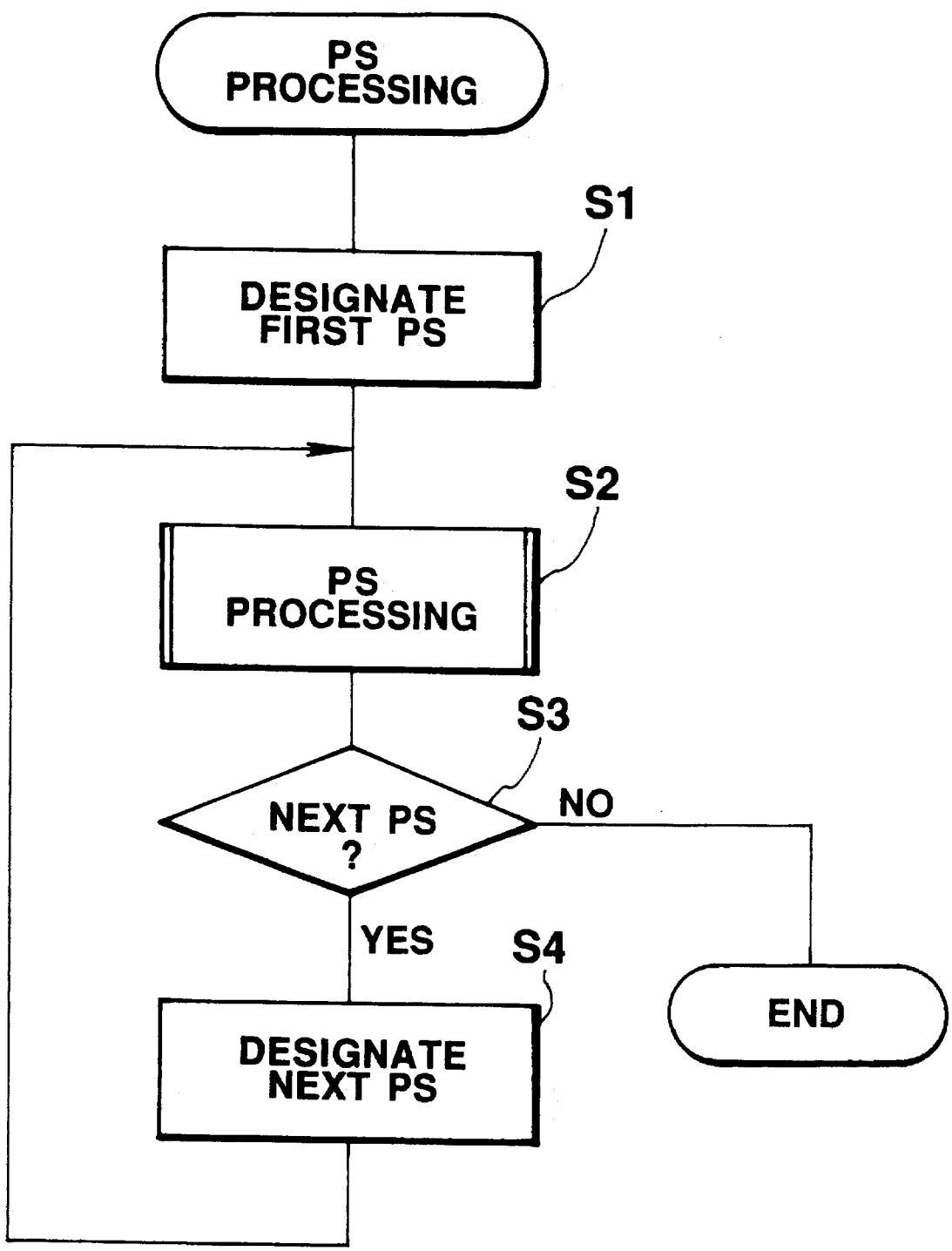
FIG. 13 is a flow chart showing the overall processing flow of PS processing.

The schematic operation of the PS processing unit 100 will be described below with reference to the flow chart shown in FIG. 13.

The RPS decoding section 102 reads out the basic definition of RPS processing having a designated RPS name from the RPS file 44, designates the first execution PS name described in the basic definition, and starts the PS decoding section 104 (S1).

The PS decoding section 104 reads out the detailed definition of PS processing having the designated execution PS name from the PS file 46, and start-controls the definition A decoding section 106, the definition C decoding section 107, the definition D decoding section 108, and the definition E decoding section 109 in accordance with the decoding results of the readout detailed definition. Furthermore, the section 104 start-controls the input processing section 112, the file processing section 114, the display processing section 116, and the printing processing section 118 through these decoding sections 106, 107, 108, and 109, thereby performing PS processing corresponding to the designated PS name (S2).

The control then returns to the RPS decoding section 102. The RPS decoding section 102 checks if an execution PS name is described in the next line of the basic definition of the RPS processing having the designated RPS name (S3). If it is determined that the execution PS name is described, the section 102 designates the execution PS name to start the PS decoding section 104 again (S4). Then, processing corresponding to the newly designated execution PS name is performed.

The processing operations S2 to S4 are repetitively performed until all the PS processing operations described as execution PS names in the basic definition of the RPS processing having the designated RPS name are completed.

Figure 14:
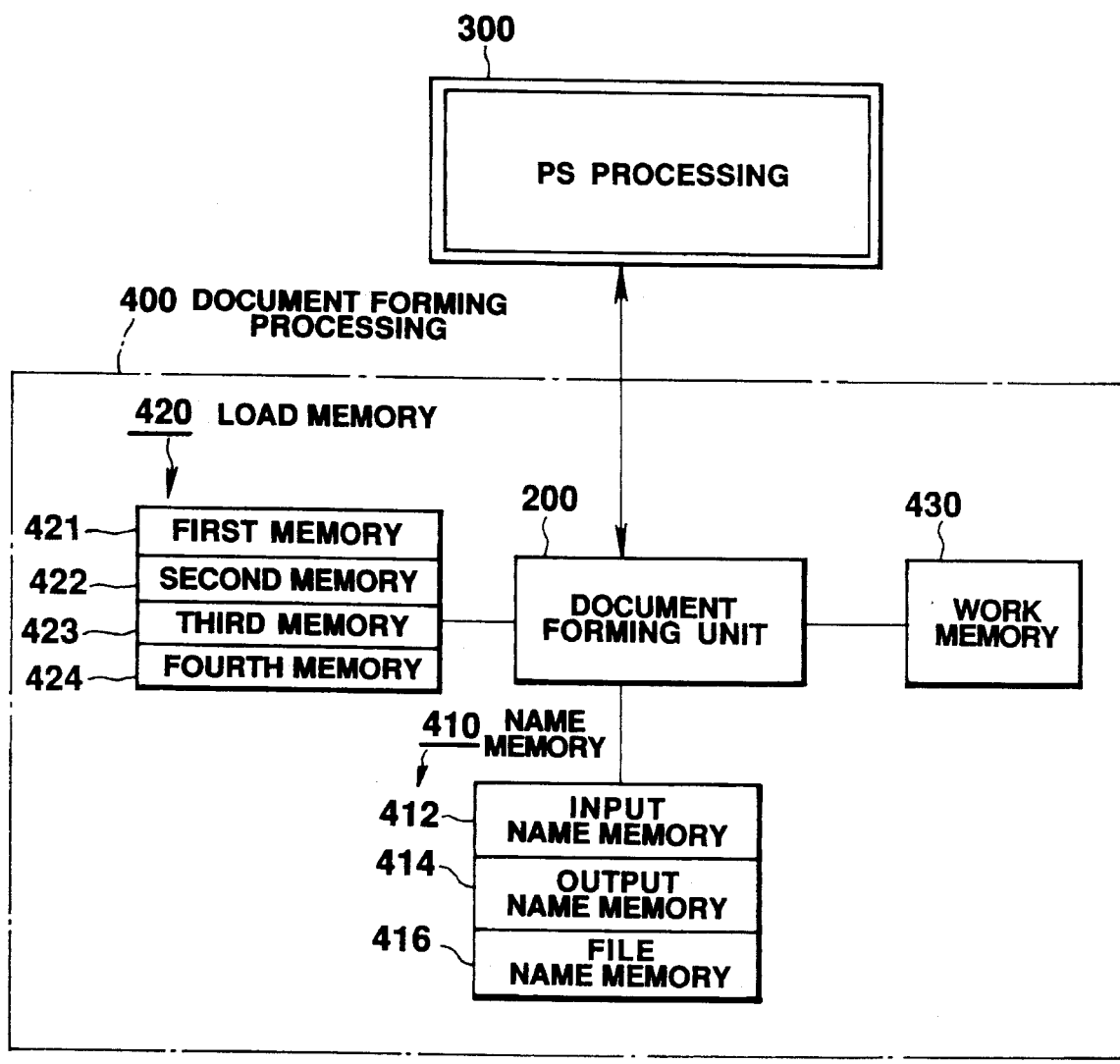
FIG. 14 is a diagram showing a work environment of the document forming unit.
Figure 15:
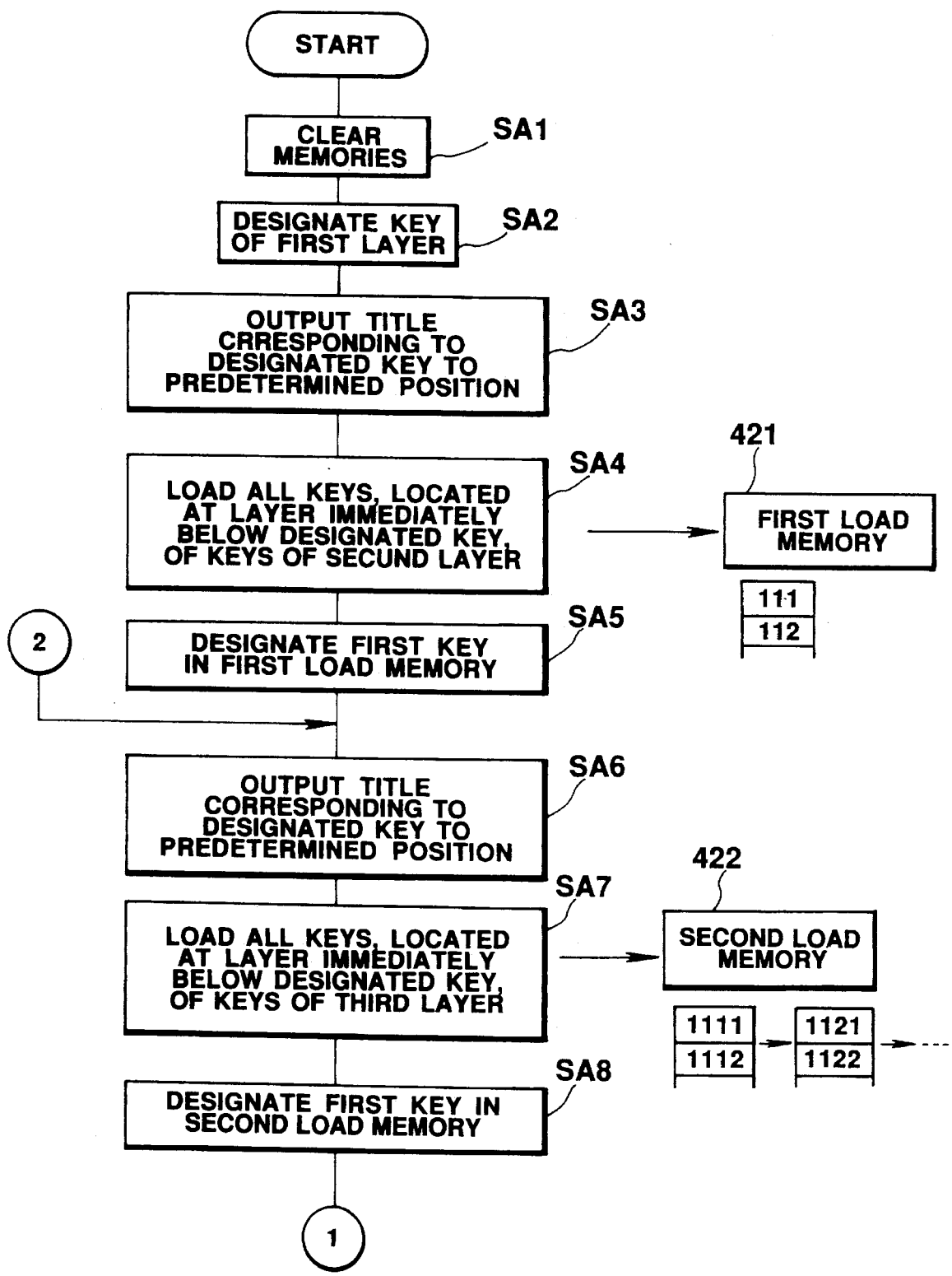
FIG. 15 is a flow chart (part 1) for explaining the overall operation of the document forming unit.

FIG. 14 expresses the system diagram representing the data processing content of this embodiment shown in FIG. 1 from the viewpoint of processing to be executed.

The above-mentioned processing corresponds to PS processing 300 surrounded by a double rectangular frame in FIG. 14. This embodiment can perform document forming processing 400 in addition to the data processing function as the PS processing 300, and automatically generates the system diagram of this embodiment shown in FIG. 2. In the document forming processing 400, the document forming unit 200 uses a name memory 410, a load memory 420, and a work memory 430, which are allocated in the RAM 28, so as to automatically generate the system diagram.

The name memory 410 comprises an input name memory 412, an output name memory 414, and a file name memory 416. The input name memory 412 is a memory for storing data to be displayed (or printed) on an input system processing display region of the display unit 26 (or the printing unit 27) in units of subsystems ("basic accounting", and "departmental accounting") in the system diagram shown in FIG. 2. The output name memory 414 is a memory for storing data to be displayed (or printed) on an output system processing display region of the display unit 26 (or the printing unit 27) in units of subsystems in the system diagram. Furthermore, the file name memory 416 is a memory for storing data to be displayed (or printed) on a file name display region of the display unit 26 (or the printing unit 27) in units of subsystems in the system diagram.

The load memory 420 comprises first, second, third and fourth load memories 421, 422, 423, and 424. The first load memory 421 is a memory for storing key names of the second layer shown in FIG. 2. The second load memory 422 is a memory for storing key names of the third layer shown in FIG. 2. The third load memory 423 is a memory for storing RPS names. The fourth load memory 424 is a memory for storing execution PS names.

The work memory 430 is used as a page memory area where image data to be displayed or printed by the display unit 26 or the printing unit 27 is drawn, or as various work areas.

The operation of the document forming unit 200 in FIG. 14 will be described below with reference to the flow charts shown in FIGS. 15 through 21, and the contents of the input and output name memories 412 and 414 shown in FIGS. 22 and 23.

The document forming unit 200 clears (initializes) the name memory 410, the load memory 420, and the work memory 430 shown in FIG. 14 (SA1).

The unit 200 reads out a key name (="11") of the first layer from the management information file 42 (SA2), and draws image data of a title (="accounting system") corresponding to the designated key name (="11") at the predetermined position (system display area) of the page memory area in the work memory 430 (SA3).

The unit 200 then loads all the key names located at the layer (second layer) immediately below the designated key name (="11") into the first load memory 421 (SA4). Thus, key names located at the second layer are written in the first load memory 421 from its start address in the order of "111" and "112".

The unit 200 then sets the start key name in the first load memory 421, i.e., "111" as a designated key (SA5).

Subsequently, the unit 200 draws image data of a title (=<basic accounting>) of the subsystem read out from the management information file 42, and corresponding to the designated key "111" at the predetermined position (first subsystem display area) of the page memory area in the work memory 430 (SA6).

The unit 200 then loads all the keys located at the layer (third layer) immediately below the current designated key "111" into the second load memory 422 (SA7). Thus, two key names of the third layer are written in the second load memory 422 in the order of "1111" and "1112".

Subsequently, the unit 200 sets the first key name "1111" stored in the second load memory 422 as a designated key (SA8). The unit 200 then performs work name position determination processing (SA9; to be described in detail later) for separately storing titles (work name 1, work name 2, and work name 3) of work blocks "table maintenance" having the key name "1111" in the input name memory 412 or the output name memory 414. Subsequently, the unit 200 performs file name extraction processing (to be described in detail later) for storing file names of files (source files, index files, and updating files) used in the work blocks "table maintenance" in the file name memory 416 (SA10).

Subsequently, the unit 200 draws image data of a processing name (="table maintenance") of the work block, and names ("work name 2" and "work name 3") of all the work processing operations (RPS processing operations) of an input system in the work block "table maintenance", which names are stored in the input name memory 412 by the work name position determination processing SA9, at the predetermined position (input system display area) of the page memory area of the work memory 430 (SA11 through SA13).

The unit 200 draws, in turn, image data of a processing name (="table maintenance") of the work block, and a name (="work name 1") of all the work processing operations (RPS processing operations) of an output system in the work block "table maintenance", which names are stored in the output name memory 414, at the predetermined position (output system display area) of the page memory area in the work memory 430 (SA14 through SA16).

Subsequently, the unit 200 draws image data of file names stored in the file name memory 416 at the predetermined position (file name display area) of the page memory area in the work memory 430 (SA17).

with the above-mentioned processing, as shown in FIG. 2, the display data (printing data) of the accounting system, and the work blocks "data maintenance" in the subsystem <basic accounting> are drawn on the page memory area in the work memory 430.

To prepare for the next image data drawing processing, the contents of the name memory 410 (the input name memory 412, the output name memory 414, and the file name memory 416) are cleared (SA18). Then, it is checked if the next key name is stored in the first load memory 421 (SA19). In this case, it is determined that "112" is stored as the next key name, and the contents of the second and third load memories 422 and 423 are cleared (SA20).

Subsequently, the unit 200 sets the next key name "112" in the first load memory 421 as a designated key (SA21), and performs the processing operations SA6 through SA18 for the subsystem <departmental accounting> corresponding to the key name "112".

With this processing, display data (printing data) of the subsystem <departmental accounting> shown in FIG. 2 are drawn on the page memory area in the work memory 430.

It is determined in the processing SA19 that there is no non-processed key name of the second layer in the first load memory 421, and this processing is ended.

In this manner, drawing data (image data) of the diagram of the accounting system shown in FIG. 2 are automatically formed.

Figure 17:
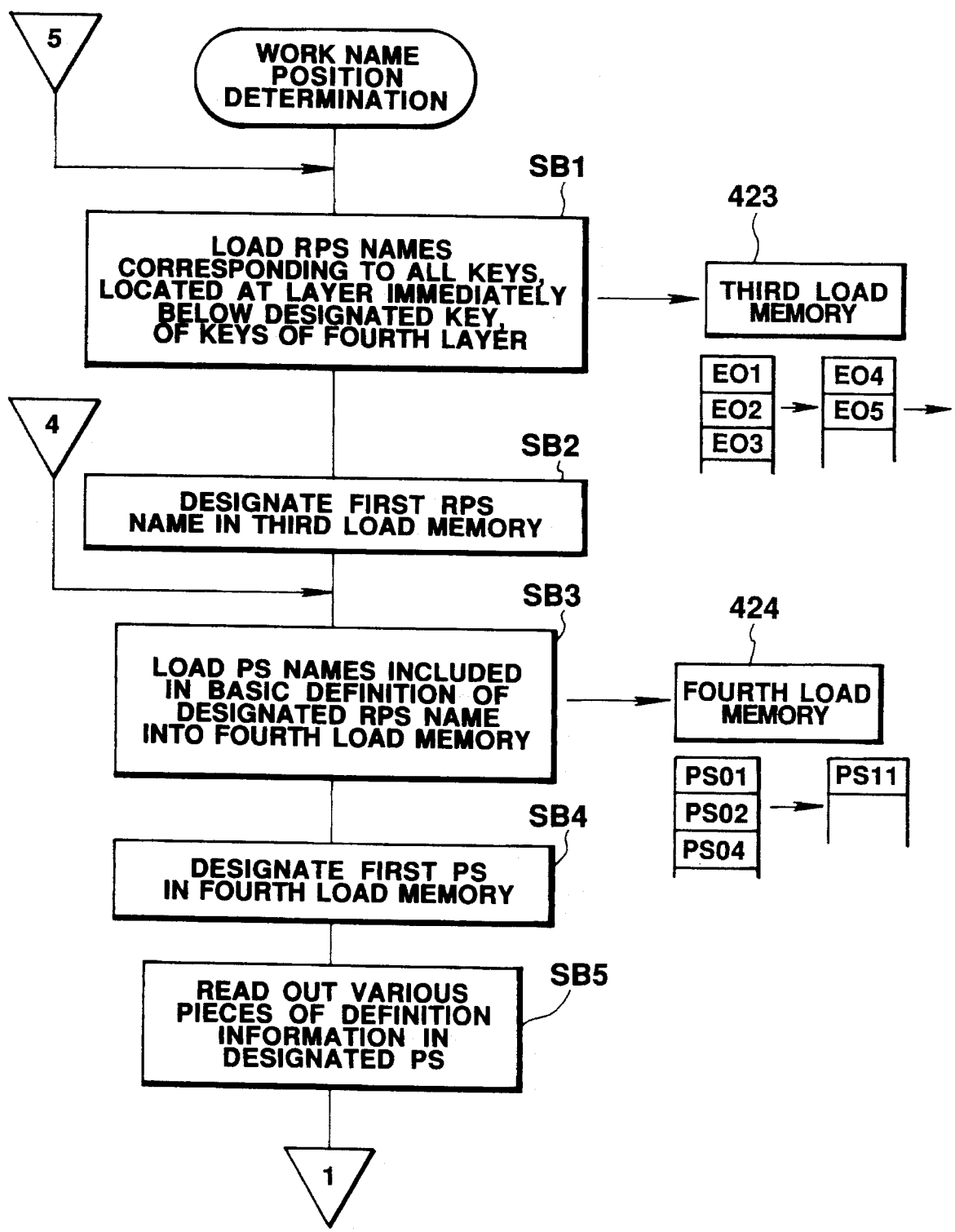
FIG. 17 is a flow chart (part 1) for explaining the detailed operation of work name position determination processing.
Figure 18:
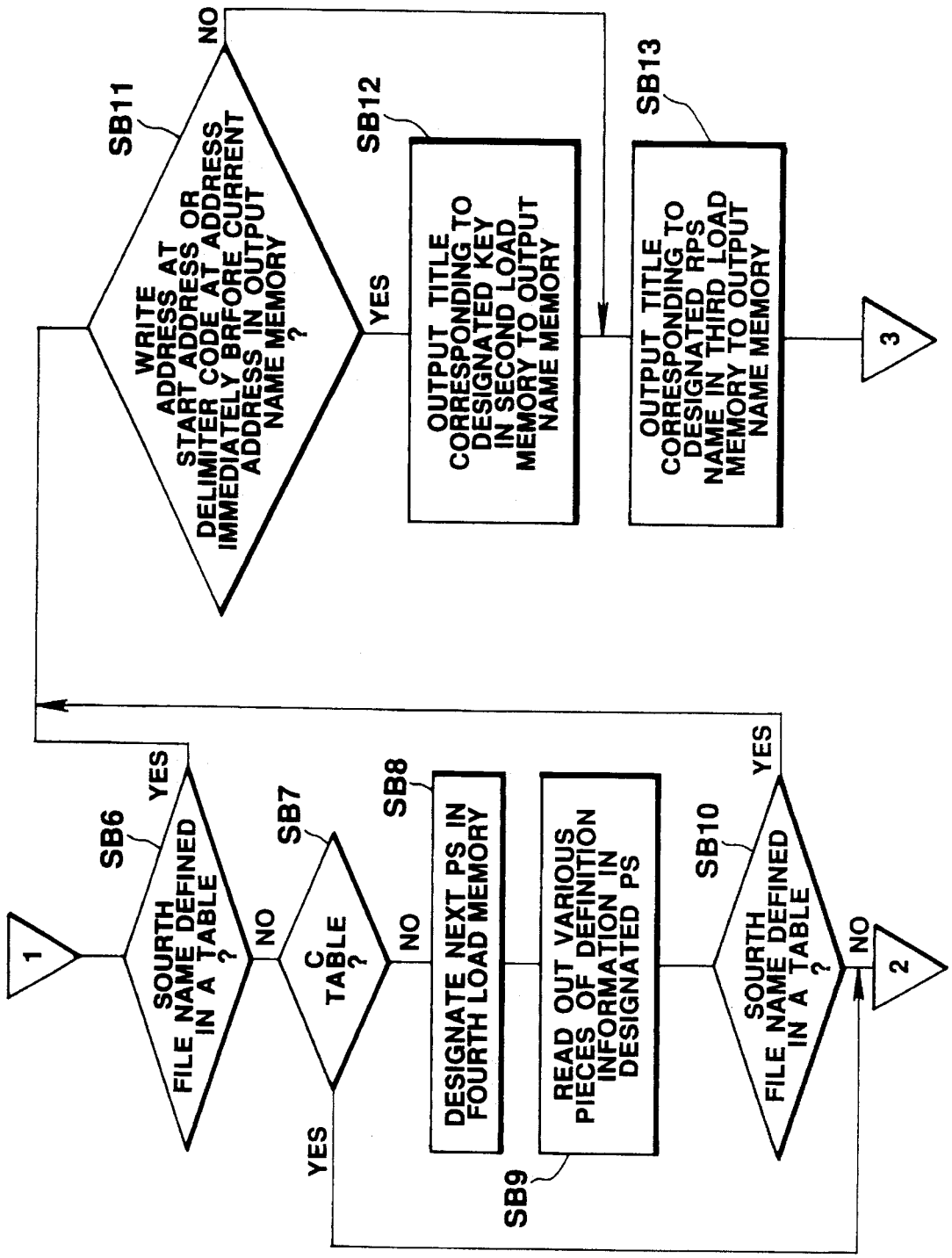
FIG. 18 is a flow chart (part 2) for explaining the detailed operation of the work name position determination processing.
Figure 19:
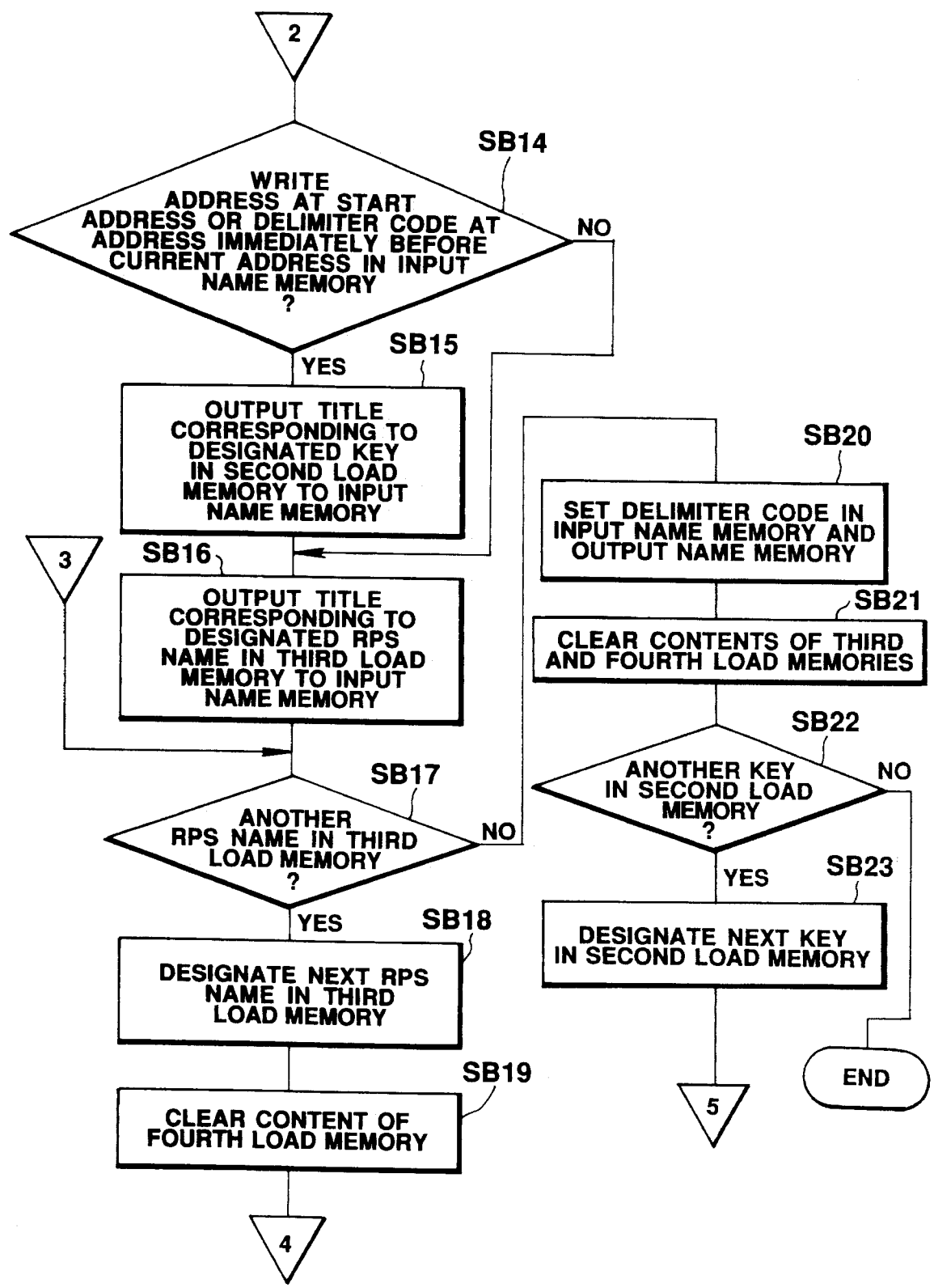
FIG. 19 is a flow chart (part 3) for explaining the detailed operation of the work name position determination processing.

The detailed operation of the work name position determination processing SA9 will be described below with reference to the flow charts shown in FIGS. 17 through 19.

First, RPS names (E01, E02, and E03) corresponding to all the keys of the fourth layer located immediately below the designated key "1111" of the third layer are loaded into the third load memory 423 (SB1). The first RPS name "E01" stored in the third load memory 423 is set as a designated RPS name (SB2).

All the PS names (PS01, PS02, and PS04) included in the basic definition of the designated RPS name "E01" are loaded from the RPS file 44, and are stored in the fourth load memory 424 (SB3).

The first execution PS name "PS01" stored in the fourth load memory 423 is set as a designated PS name (SB4), and the contents of various pieces of definition information ($A_{01}$ table, $D_{01}$ table) of the designated PS name "PS01" are read out from the Ps file 46 (SB5).

It is checked if the definition of a source file name is present in the column of the source file name 141 in the A table ($A_{01}$ table) (SB6). In this case, since there is no definition of the source file in the $A_{01}$ table (since the corresponding processing is display processing of a start frame), it is then checked if the C table is present (SB7). In this case, since the C table is not present, the next execution PS name "PS02" in the fourth load memory 424 is set as a designated PS name (SB8).

Various pieces of definition information ($A_{02}$ table, $C_{02}$ table, and $E_{02}$ table) in the designated PS name "PS02" are read out from the PS file 46 (SB9). It is checked if a source file name is defined in the A table (in this case, the $A_{02}$ table) (SB10). In this case, since the $A_{02}$ table includes the definition of the source file name (since the corresponding processing is daily report printing processing), it is checked if the write address is at the start address or a delimiter code "," is present at an address immediately before the current write address in the output name memory 414 (SB11). In this case, since no data is written in the output name memory 414 yet, the title ("table maintenance") of the work block corresponding to the designated key "1111" in the second load memory 422 is written at the start address of the output name memory 414 (SB12). Subsequently, the title ("work name 1") corresponding to the designated RPS name (E01) stored in the third load memory 423 is read out from the management information file 42, and is written at the next address of the output name memory 414 (SB13).

It is then checked if another RPS name is stored in the third load memory 423 (SB17). In this case, since the RPS name "E02" is stored after the RPS name "E01", the next RPS name "E02" in the third load memory 423 is set as a designated RPS name (SB18). After the content of the fourth load memory 424 is cleared (SB19), the control returns to the processing SB3.

All the execution PS names ("PS11") included in the basic definition of the designated RPS name ("E02") are read out from the RPS file 44, and are stored in the fourth load memory 424. In the processing SB4, "PS11" stored at the start address of the fourth load memory 424 is set as a designated PS name. The processing SB5 is then executed to read out all the pieces of definition information ($A_{11}$ table, $C_{11}$ table, and $D_{11}$ table) of the designated PS name "PS11" from the PS file 46, and in the processing SB6, it is checked if a source file name is designated in the $A_{11}$ table. In this case, since no source file name is designated in the $A_{11}$ table (since the corresponding processing is slip input processing), the control advances to the processing SB7 to check if the C table is present. In this case, since the $C_{11}$ table is present, it is then checked if the write address is at the start address or a delimiter code "," is present at an address immediately before the current write address of the input name memory 412 (SB14). Since no data is written in the input name memory 412 yet, a title corresponding to the designated key in the second load memory 422 is written at the start address of the input name memory 412 (SB15). In this case, since "1111" is set as the designated key in the processing SA7 in the flow chart shown in FIG. 15, the title "table maintenance" of the work block corresponding to the designated key "1111" is written at the start address of the input name memory 412.

Then, the processing SB17 is performed, and it is determined that the RPS name "E03" is present in the third load memory 423. The processing SB18 and the processing S19 are performed. More specifically, the RPS name "E03" is set as the designated RPS name (SB18), and the fourth load memory 424 is cleared (SB19). The control then returns to the processing SB3 again, and the above-mentioned processing operations after the processing SB3 are executed again. Since the RPS processing having the designated RPS name "E03" corresponds to input system processing in this case, the input system processing is determined in a series of processing operations SB6→SB7→SB14 or SB6→SB8→SB9→SB10→SB14. In the processing SB14, it is determined that the write address is not the start address of the input name memory 412, and no delimiter code "," is present at an address immediately before the current write address, and the control advances to the processing SB16. In this processing, a title (work name 3) corresponding to the designated RPS name "E03" in the third load memory 423 is read out from the management information file 42, and is written at the next write address of the input name memory 412. In the processing SB17, it is checked if another RPS name is present in the third load memory 423. In this case, since there is no non-processed RPS name in the third load memory 423, a delimiter code "," is written at the next write addresses in the input name memory 412 and the output name memory 413 (SB20).

Figure 22:
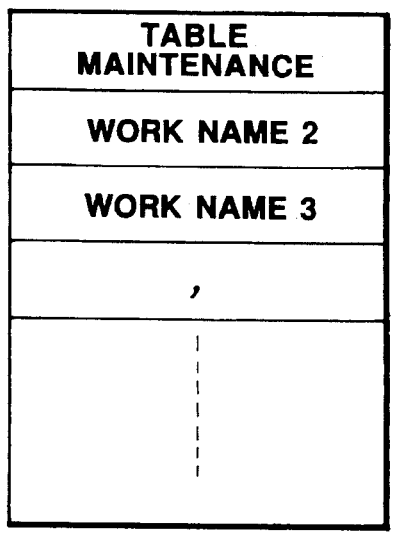
FIG. 22 is a view showing the content of data stored in an input name memory by the work name position determination processing.
Figure 23:
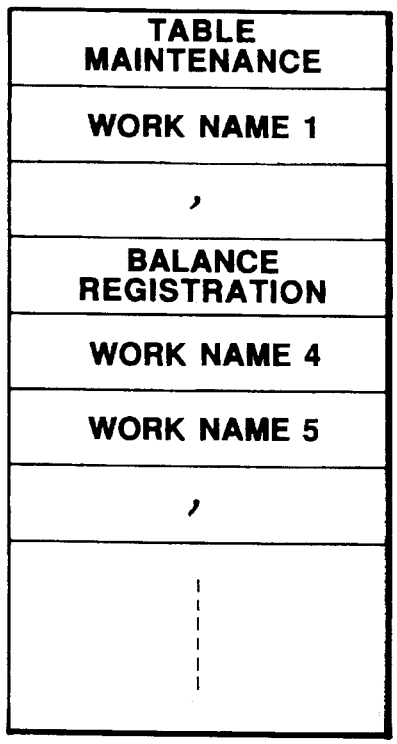
FIG. 23 is a view showing the content of data stored in an output name memory by the work name position determination processing.

With the above-mentioned processing, "table maintenance", "work name 2", "work name 3", and "," are written in the input name memory 412, as shown in FIG. 22. On the other hand, "table maintenance", "work name 1", and "," are written in the output name memory 414, as shown in FIG. 23.

In this manner, pieces of information for forming the system diagram for the work blocks "table maintenance" in the subsystem <basic accounting> located at the third layer are stored in the input name memory 412 and the output name memory 414.

After the processing SB20, the contents of the third and fourth load memories 423 and 424 are cleared (SB21), and it is then checked if a non-processed key remains in the second load memory 422 (SB22). In this case, since the key name "1112" of the work block entitled "balance registration" still remains, the key name "1112" is set as a designated key (SB23), and the processing operations SB1 through SB22 are performed again. More specifically, the same processing as that for the work blocks entitled "table maintenance" is performed for the work block having the key name "1112" and the title "balance registration". As a result, as shown in FIG. 23, "balance registration", "work name 4", "work name 5", and "," are written in the output name memory 414 after "table maintenance", "work name 1", and ",".

Figure 16:
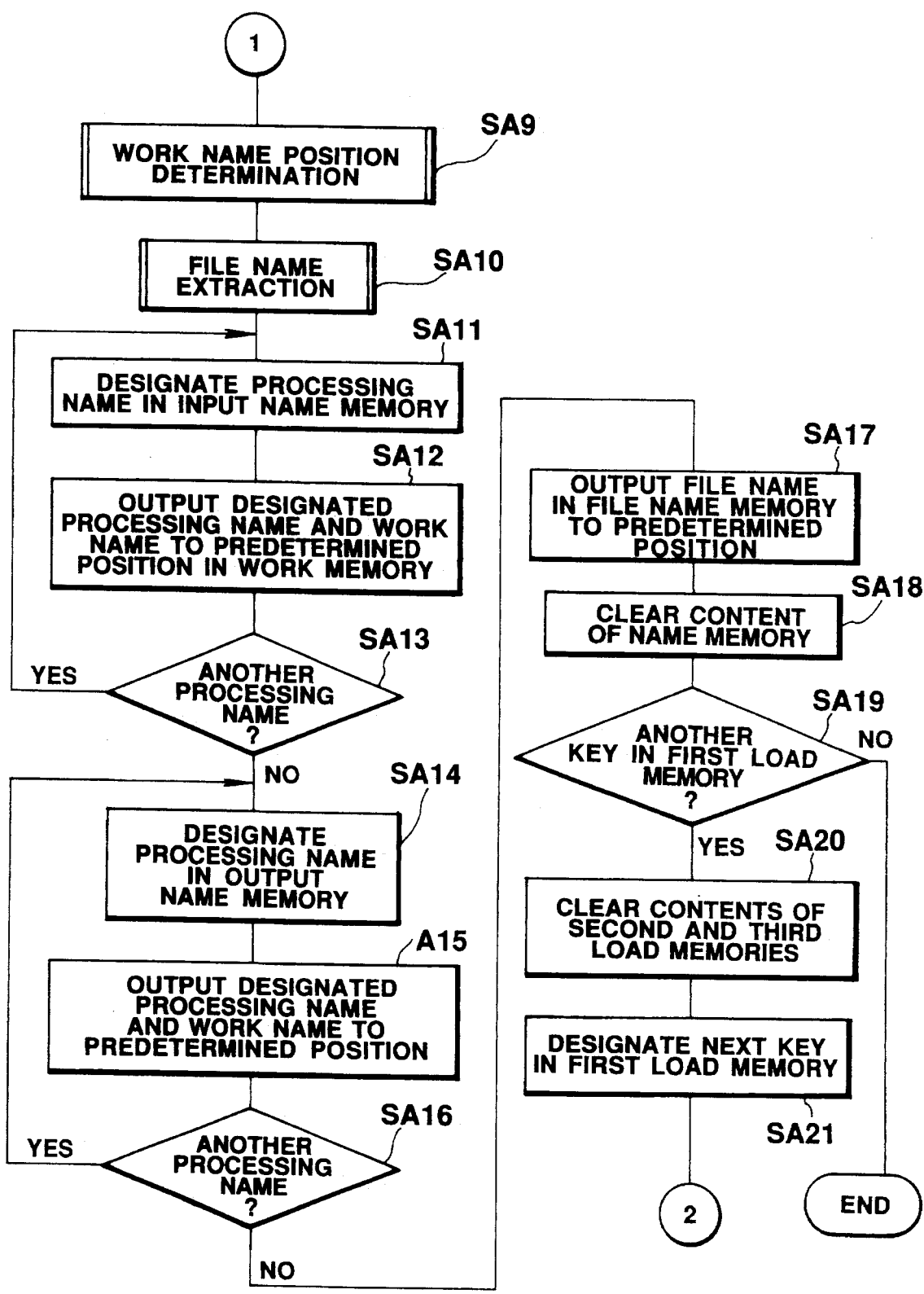
FIG. 16 is a flow chart (part 2) for explaining the overall operation of the document forming unit.

In the processing SB22, it is determined that there is no non-processed key in the second load memory 422, and the control returns to the file extraction processing SA10 in the flow chart shown in FIG. 16.

After a key name "112" of the subsystem <departmental accounting> is designated as the next key in the first load memory 421 in the processing SA21 in the flow chart of FIG. 16, the work name position determination processing SA9 is also performed for each of work blocks having key names "1121" and "1122" located at the lower layer of the key name "112". Thus, in units of work blocks located at the lower layer of the subsystem <departmental accounting>, work processing operations comprising each work block are grouped into the input and output systems, and are stored in the input name memory 412 and the output name memory 414.

Figure 20:
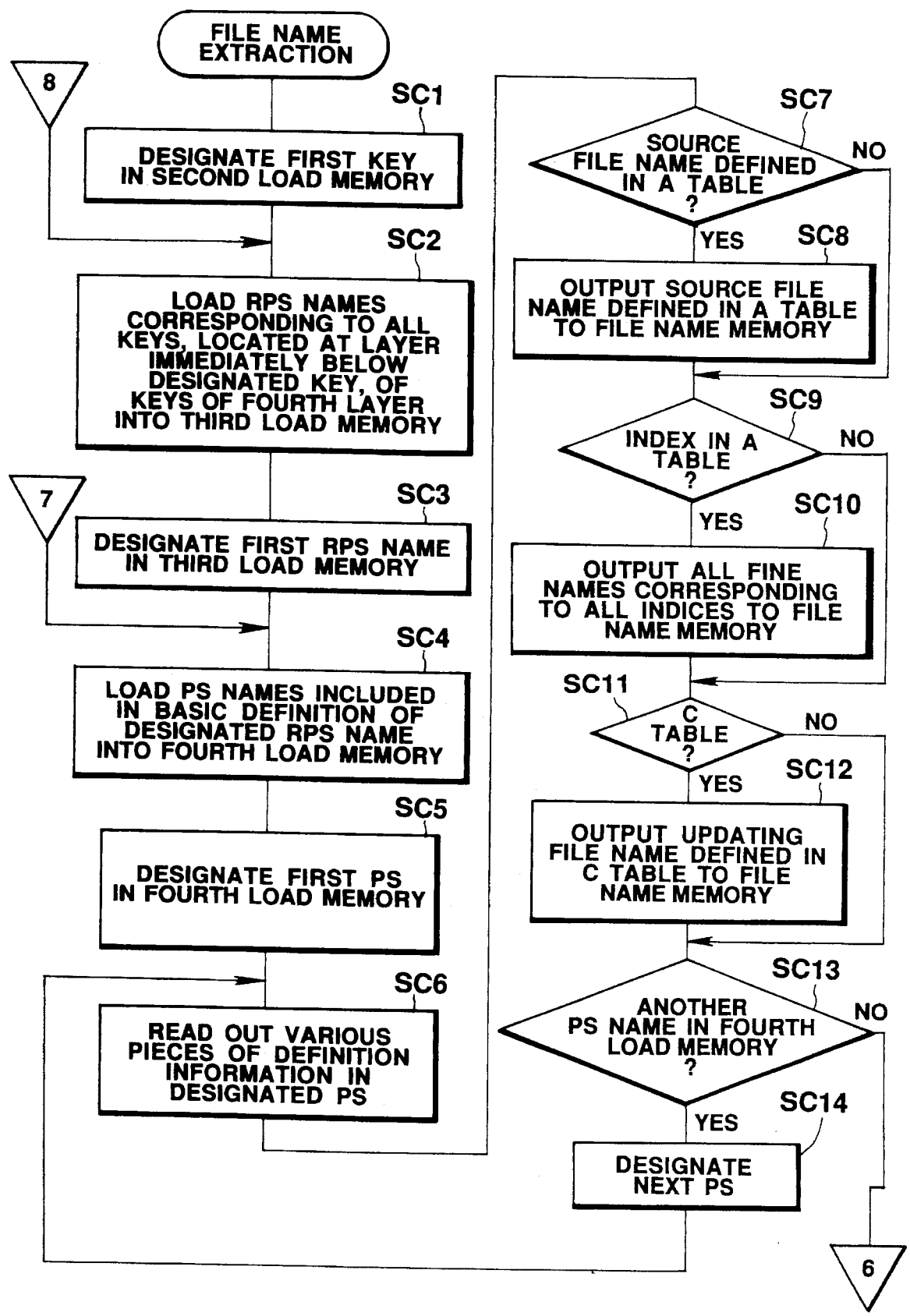
FIG. 20 is a flow chart (part 1) for explaining the detailed operation of file name extraction processing.
Figure 21:
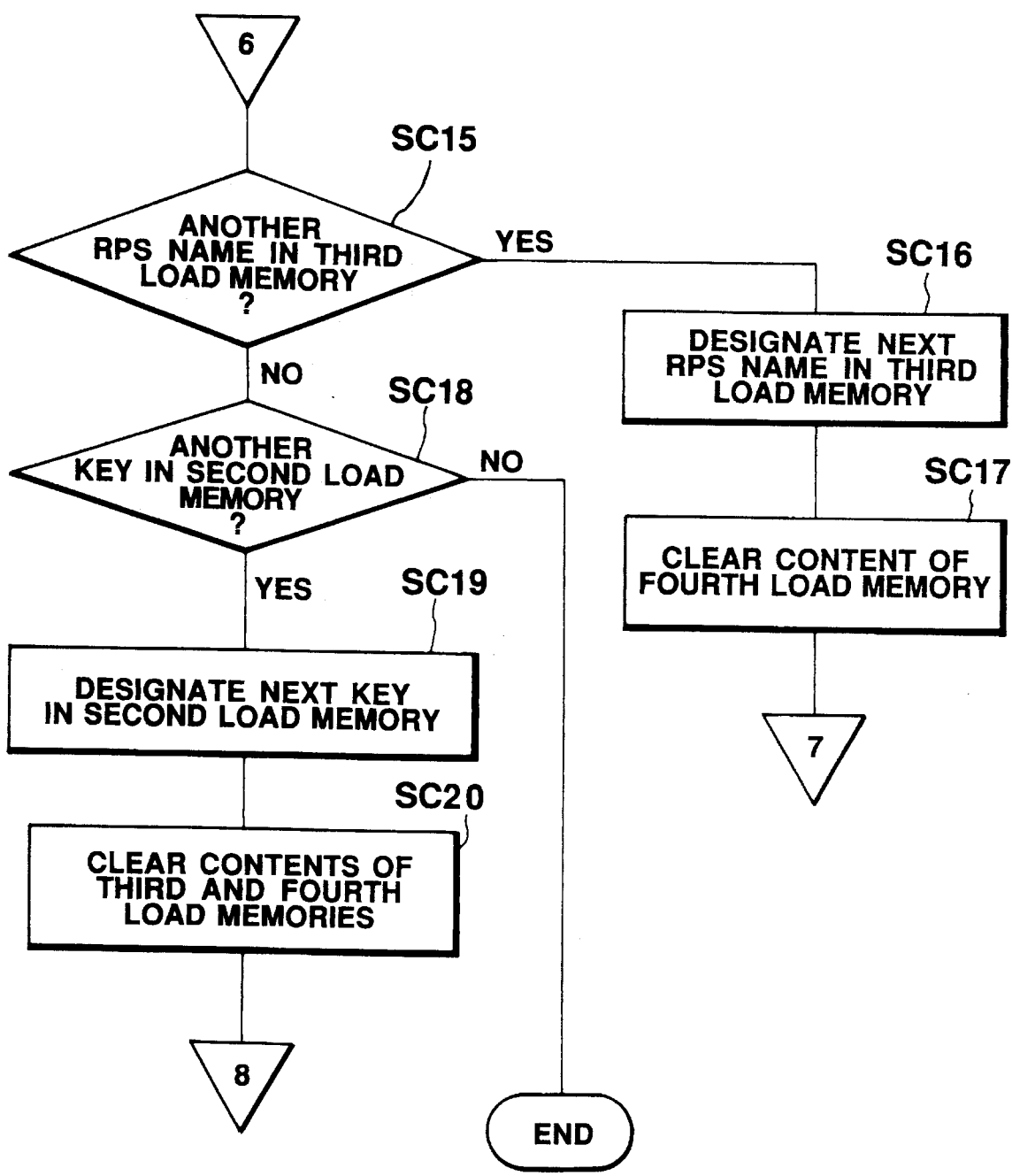
FIG. 21 is a flow chart (part 2) for explaining the detailed operation of the file name extraction processing.

The detailed operation of the file name extraction processing SA10 shown in the flow chart of FIG. 16 will be described below with reference to the flow charts shown in FIGS. 20 and 21.

In this processing, the first key in the second load memory 422 is designated (SC1). Thus, the key name "1111" corresponding to the work block "table maintenance" is set as a designated key.

All the RPS names corresponding to all the keys of the fourth layer located immediately below the designated key are loaded from the management information file 42, and are stored in the third load memory 423 (SC2). Thereafter, an RPS name stored at the start address in the third load memory 423 is set as a designated RPS name (SC3). In this manner, address names "E01", "E02", and "E03" of address processing operations located at the layer immediately below the key name "1111" are stored in the third load memory 423, and "E01" is set as the designated RPS name (see FIG. 2).

Execution PS names described (included) in the basic definition of the designated RPS name are loaded from the RPS file 44, and are stored in the fourth load memory 424 (SC4). Thereafter, the first execution PS name in the fourth load memory 424 is designated as a designated PS name (SC5). In this manner, the execution PS names "PS01", "PS02", and "PS04" described in the basic definition of the address processing having the address name "E01" are stored, and "PS01" is set as the designated PS name (see FIG. 13).

Various pieces of definition information described in the detailed definition of the PS processing having the designated PS name are read out from the PS file 46 (SC6). It is checked if a source file name is defined in the A table in the various pieces of readout definition information (SC7). If it is determined that no source file name is defined, it is then checked if the content data 142c of the A table; includes a description of "# index (file name)" (SC9). If it is determined that the content data includes the description of "# index (file name)", file names of all the index files designated by the description of "# index (file name)" are written in the file name memory 416 (SC10).

With the above-mentioned operation, the A01 table and the D01 table are read out from the detailed definition of the PS processing having the designated PS name "PS01" (SC6). After it is determined that no source file name is defined in the A01 table (SC7), it is determined that the description of "# index (file name)" is included in the content data 142c of the A01 table (SC9). The file names of all the index files designated by the description of "# index (file name)" are written in the file name memory 416.

After the processing SC10, it is checked if the C table is present in the various pieces of definition information in the detailed definition of the PS processing having the designated PS name (SC11). If it is determined that there is no C table, it is then checked if a non-processed PS name remains in the fourth load memory (SC13). If it is determined that a non-processed PS name remains, an execution PS name stored after the designated PS name is set as the next designated PS name (SC14).

With the above-mentioned operation, "PS02" as the next execution PS name of "PS01" is designated as the designated PS name.

After the processing SC14, the control returns to the processing SC6 again. In the processing SC6, the content (definition information) of the detailed definition of the PS processing having the next designated PS name "PS02" is read out from the PS file 46. Thus, the $A_{02}$ table, the $C_{02}$ table, and the $E_{02}$ table are read out (see FIG. 10). In the processing SC7, it is determined that the $A_{02}$ table includes a source file definition, and a source file name defined in the A table (in this case, the $A_{02}$ table) is written at the next write address of the file name memory 416 (SC8). Subsequently, the processing SC9 is performed, and if the content data 142a of the $A_{02}$ table does not include a description of index, the control advances to the processing SC11. It is then determined that the $C_{02}$ table is present. In the processing SC12, an updating file name defined in the $C_{02}$ table is stored at the next write address of the file name memory 416. Subsequently, in the processing SC13, it is determined that an execution PS name "PS04" is present, and in the next processing SC14, the execution PS name "PS04" is set as designated PS name. The control then returns to the processing SC6. In the processing SC6, the "$A_{04}$ table" and the "$D_{04}$ table" described in the detailed definition of the PS processing having the execution PS name "PS04" are read out from the PS file 46 (see FIG. 10), and the processing operations SC7 through SC10 are performed according to the definitions of the source file name 141 and the content data 142c in the A04 table. Thereafter, it is determined in the processing SC11 that there is no C table, and the control jumps to the decision processing SC13. In the decision processing SC13, it is determined that no non-processed execution PS name remains. It is then checked if a non-processed RPS name remains in the third load memory 423 (SC15). If it is determined that a non-processed RPS name remains, the next RPS name in the third load memory 423 is set as a designated RPS name (SC16), and thereafter, the content of the fourth load memory 424 is cleared (SC17). The control returns to the processing SC4 again.

With the above-mentioned operation, the RPS name "E02" is set as the next designated RPS name.

The processing operations SC6 through SC15 are performed for the designated RPS name "E02" in the same manner as the processing for the previous designated RPS name "E01". Thus, of the $A_{11}$, $C_{11}$, and $D_{11}$ tables described in the basic definition of the RPS processing having the RPS name "E02", the file names of source files defined in the A11 table, and the file names of updating files defined in the $C_{11}$ table are extracted, and the extracted file names are written in the file name memory 416.

It is determined again in the decision processing SC15 that a non-processed RPS name "E03" remains. The same processing as that for the RPS processing operations having the RPS names "E01" and "E02" is performed for RPS processing having the RPS name "E03", and all the extracted file names are written in the file name memory 416.

Furthermore, the decision processing SC15 is performed again. If it is determined in the processing SC15 that there is no non-processed RPS name, it is then checked if a non-processed key name is present in the second load memory 422 (SC18). If it is determined that the non-processed key name is present, the next key in the second load memory 422 is set as a designated key (SC19), and thereafter, the contents of the third and fourth load memories 423 and 424 are cleared (SC20). The control then returns to the processing SC2.

with the above-mentioned operation, the key name "1112" is set as the next designated key, and the same processing as that for the RPS names "E01" and "E02" is performed for RPS names "E04" and "E05" in the work block corresponding to the key name "1112" and having the title "balance registration", and all the extracted file names are stored in the file name memory 416.

Upon completion of the file extraction processing for the RPS name "E05", it is determined in the decision processing SC18 that there is no non-processed RPS name in the second load memory 422, and the processing is ended. Thus, the control returns to the processing SA11 in the flow chart shown in FIG. 16.

With the above-mentioned processing, in units of work blocks constituting the subsystem <basic accounting>, all the file names used in RPS processing operations comprising these work blocks are extracted, and the extracted file names are stored in the file name memory 416.

When a key name "112" is set as a designated key in the processing SA21 in the flow chart shown in FIG. 16, the file name extraction processing SA10 is also performed for the subsystem <departmental accounting>. Thus, in units of work blocks comprising the subsystem <departmental accounting>, all the file names used in RPS processing operations comprising these work blocks are extracted, and the extracted file names are stored in the file name memory 416.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A record data processing apparatus for carrying out at least an input record operation, a file update operation in accordance with said input record, and an output record operation, comprising:

file storage means for storing a plurality of records as a file;

definition information setting means for setting definition information, which definition information comprises at least a first table which defines said input record operation and in accordance with which a record is generated based on a record of the file stored in said file storage means, a second table which defines said file update operation of the file stored in said file storage means and in accordance with which the generated record is updated, and a third table in accordance with which said output record operation regarding the updated record is performed;

storage means for storing said definition information set by said definition information setting means;

said storage means further storing management data which indicates a correspondence between names of said operation and said definition information;

data processing means, coupled to said storage means and to said file storage means, for executing the input record operation, the file update operation and the output operation in accordance with said definition information;

retrieval means for retrieving, in accordance with the management data, at least the definition information associated with the input record operation, the definition information associated with the file update operation, and definition information associated with the output record operation, from the definition information stored in said storage means; and output means for automatically and visually outputting in a tabular form a schematic diagram indicating a software procedure of at least the input record operation, the file update operation and the output record operation required to perform a transaction processing in accordance with the retrieved information together with the names of the input record operation, the file update operation and the output record operation.

2. The record data processing apparatus according to claim 1, wherein the management data comprises a hierarchical data structure of a first layer in which a system is described, a second layer in which subsystems constituting the system are described, a third layer in which work blocks constituting each subsystem are described, and a fourth layer in which actual work processing operations corresponding to program levels constituting the work blocks are described.

3. The record data processing apparatus according to claim 2, wherein the subsystems include a basic accounting subsystem and a departmental subsystem.

4. The record data processing apparatus according to claim 3, wherein the configuration of each of the basic accounting subsystem and the departmental subsystem is expressed by works of an input system and titles of work processing operations realizing these works, works of an output system and titles of work processing operations realizing these works, and file names used in these subsystems.

5. A data processing apparatus for carrying out a plurality of data processing operations, comprising:

file storage means for storing data for individual data processing operations as a file;

definition information setting means for setting definition information, which definition information comprises at least information associated with an output data processing operation of the data processing operations, information associated with a file processing operation of the file stored in said file storage means, and information associated with an output data processing operation of the data processing operations;

storage means for storing said definition information set by said definition information setting means;

said storage means further storing management data which indicates a correspondence between names of the data processing operations and said definition information;

data processing means, coupled to said storage means and to said file storage means, for reading out data from said file storage means defined by the definition information stored in said storage means and for executing the data processing operations based on the readout data from said file storage means;

retrieval means for retrieving, in accordance with the management data, at least the definition information associated with said data processing apparatus, definition information associated with the file processing operation, and definition information associated with the output data processing operation, from the definition information stored in said storage means; and output means for automatically and visually outputting in a tabular form a schematic diagram indicating a software procedure of at least the input data processing operation, the file processing operation and the output data processing operation required to perform a transaction processing in accordance with the retrieved information together with the names of the input data processing operation, the file processing operation and the output data processing operation; and wherein the management data comprises a hierarchical data structure of a first layer in which a system is described, a second layer in which subsystems constituting the system are described, a third layer in which work blocks constituting each subsystem are described, and a fourth layer in which actual work processing operations corresponding to program levels constituting the work blocks are described.

6. The record data processing apparatus according to claim 5, wherein the subsystems include a basic accounting subsystem and a departmental subsystem.

7. The record data processing apparatus according to claim 6, wherein the configuration of each of the basic accounting subsystem and the departmental subsystem is expressed by works of an input system and titles of work processing operations realizing these works, works of an output system and titles of work processing operations realizing these works, and file names used in these subsystems.

8. A method of generating a schematic block diagram of transaction data processed by a computer having an input unit, a process unit, and an output unit, comprising the computer implemented steps of:

a) reading a system from a management data file having a hierarchical data structure of a first layer in which the system is described, a second layer in which subsystems constituting the system are described, a third layer in which work blocks constituting each subsystem are described, and a fourth layer in which actual work processing operations constituting the work blocks are described, and outputting a title corresponding to the system in a predetermined position of the output unit;

b) reading a subsystem from the management data file and outputting a title corresponding to the read subsystem in a predetermined position of the output unit;

c) outputting a processing name of one of the work blocks and names of all the work processing operations of an input system in the outputted work block in predetermined positions of the output unit;

d) outputting a processing name of the outputted work block and names of all the work processing operations of an output system in the outputted work block in predetermined positions of the output unit; and e) outputting names of the files processed by the process unit in predetermined positions of the output unit.

* * * * *